(12) United States Patent
Premerlani et al.

(10) Patent No.: US 7,599,161 B2
(45) Date of Patent: Oct. 6, 2009

(54) RELAY DEVICE AND CORRESPONDING METHOD

(75) Inventors: William Premerlani, Scotia, NY (US); Marcelo Valdes, Burlington, CT (US); Thomas Frederick Papallo, Jr., Farmington, CT (US); Gregory P. Lavoie, Lee, NH (US); Radoslaw Narel, Kensington, CT (US)

(73) Assignee: General Electric Company, Schenectady, NY (US)

( * ) Notice: Subject to any disclaimer, the term of this patent is extended or adjusted under 35 U.S.C. 154(b) by 348 days.

(21) Appl. No.: 11/618,192

(22) Filed: Dec. 29, 2006

(65) Prior Publication Data

US 2008/0158753 A1     Jul. 3, 2008

(51) Int. Cl.
*H02H 7/00* (2006.01)
(52) U.S. Cl. .............................. 361/62; 361/63; 361/64; 361/65; 361/66; 361/67; 361/68; 361/80; 361/81; 361/82; 361/84
(58) Field of Classification Search ............. 361/62–59, 361/80–82, 84
See application file for complete search history.

(56) References Cited

U.S. PATENT DOCUMENTS 6,297,939 B1 * 10/2001 Bilac et al. .................... 361/64

(Continued)

OTHER PUBLICATIONS

U.S. Appl. No. 11/618,175, filed Dec. 29, 2006, William Premerlani et al.

"The Single-Processor Concept for Protection and Control of Circuit Breakers in Low-Voltage Switchgear", M Valdes, T Papallo & I Purkayastha, IEEE Transactions Jul./Aug.

(Continued)

*Primary Examiner*—Stephen W Jackson
*Assistant Examiner*—Terrence R Willoughby
(74) *Attorney, Agent, or Firm*—GE Global Patent Operation

(57) ABSTRACT

A method of operating a relay device, in an electrical circuit comprising first and second main circuit breakers, and a bus tie circuit breaker connecting the first and second main circuit breakers, the method comprising computing a first positive sequence current phasor for the first main circuit breaker and a second positive sequence current phasor for the second main circuit breaker computing a first positive sequence voltage phasor for the first main circuit breaker and a second positive sequence voltage phasor for the second main circuit breaker; computing a correction of the first positive sequence voltage and second positive sequence voltage to a line-to-neutral phase angle reference if there is any rotation in a potential transformer connection; determining a fault has occurred when a magnitude of a current through at least one of the first main circuit breaker or the second main circuit breaker exceeds a predetermined threshold; determining a phase angle difference by comparing the phase angle of the positive sequence current phasor with the phase angle of the positive sequence voltage phasor for both the first main circuit breaker or the second main circuit breaker having the magnitude of current determined to have exceeded the predetermined level; and determining the fault is located upstream or downstream of the first main circuit breaker or the second main circuit breaker having the magnitude of current determined to have exceeded the predetermined level, if the phase angle difference is determined to be above a predetermined amount.

12 Claims, 22 Drawing Sheets

U.S. PATENT DOCUMENTS

| | | | |
|---|---|---|---|
| 6,714,395 B2 * | 3/2004 | Meisinger et al. | 361/62 |
| 6,937,453 B2 * | 8/2005 | Kase et al. | 361/81 |
| 6,985,784 B2 | 1/2006 | Vandevanter et al. | |
| 6,985,800 B2 * | 1/2006 | Rehtanz et al. | 700/292 |
| 7,012,421 B2 | 3/2006 | Lavoie et al. | |
| 2004/0133370 A1 | 7/2004 | Lavoie et al. | |

OTHER PUBLICATIONS

"IEEE Guide for Performing Arc-Flash Hazard Calculations", IEEE Standard 1584-2002, Published by The Institute of Electrical and Electronic Engineers, Inc. NY, NY.

"IEEE Guide for Performing Arc-Flash Hazard Calculations-Amendment 1" IEEE Standard 1584a-2204, Published by the Institute of Electrical and Electronic Engineers, Inc. NY, NY.

* cited by examiner

RELAY DEVICE AND CORRESPONDING METHOD

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

NONPATENT DOCUMENTS REFERENCED HEREIN

The following documents are cited herein and are hereby incorporated by reference:
[1] "The Single-Processor-Concept for Protection and Control of Circuit Breakers in Low-Voltage Switchgear", M Valdes, T Papallo & I Purkayastha, IEEE Transactions July/August 2004, pp. 932-940.
[2] "IEEE Guide for Performing Arc-Flash Hazard Calculations", IEEE Standard 1584-2002, Published by The institute of Electrical and Electronic Engineers, Inc. NY, N.Y.

LIST OF ABBREVIATIONS AND ACRONYMS

The following is a partial list of abbreviations and acronyms used herein:
HRG High-Resistance Ground/Grounding
PPE Personal Protective Equipment
HRC# Hazard Risk Category #
ST Short-Time
PU Pick-Up
CB Circuit Breaker
MCC Motor Control Center
FLA Full Load Amperes
ZSI Zone Selective Interlock
RMS Root Mean Square
CT Current Transformer
ZSI Zone-Selective-Interlocking
PDZ Partial Differential Zone
RC Reverse Current
$P_{RC}$ Reverse Current Protection
TCC Time-Current-Curve
MCCB Molded Case Circuit Breaker

BRIEF DESCRIPTION OF THE INVENTION

One or more of the above discussed or other disadvantages may be overcome by an embodiment of the present invention, in which a method of operating a relay device, in an electrical circuit comprising first and second main circuit breakers, and a bus tie circuit breaker connecting the first and second main circuit breakers, the method comprising the steps of: a) computing a first positive sequence current phasor for the first main circuit breaker and a second positive sequence current phasor for the second main circuit breaker; b) computing a first positive sequence voltage phasor for the first main circuit breaker and a second positive sequence voltage phasor for the second main circuit breaker; c) computing a correction of the first positive sequence voltage and second positive sequence voltage to a line-to-neutral phase angle reference if there is any rotation in a potential transformer connection; d) determining a fault has occurred when a magnitude of a current through at least one of the first main circuit breaker or the second main circuit breaker exceeds a predeterminted threshold; e) determining a phase angle difference by comparing the phase angle of the positive sequence current phasor with the phase angle of the positive sequence voltage phasor for both the first main circuit breaker or the second main circuit breaker having the magnitude of current determined to have exceeded the predetermined level; and f) determining the fault is located upstream or downstream of the first main circuit breaker or the second main circuit breaker having the magnitude of current determined to have exceeded the predetermined level, if the phase angle difference is determined to be above a predetermined amount.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

Further, the purpose of the foregoing Paragraph Titles used in both the background and the detailed description is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Paragraph Titles are neither intended to define the invention or the application, which only is measured by the claims, nor are they it intended to be limiting as to the scope of the invention in any way.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 21 illustrates an embodiment of a functional circuit block diagram of the present invention illustrating an intelligent electronic device IED configured with a central processor used for a Differential Zone Selective Interlocking scheme to trip circuit breakers connected to the system and also including nodes at each circuit breaker where each node interfaces with the central processor to provide node data for processing and decision-making and the like.

BACKGROUND OF THE INVENTION

Field of the Invention

The present invention relates in general relays and, more particularly, to power system protective relays.

Introduction. Time-based coordination and protection is the standard basis for coordinating low-voltage power distribution systems. Enhancements, such as zone-selective-interlocking and bus-differential protection, can be used to accelerate the operation of protective devices. However, these improvements may be costly, difficult to implement, and may not function as expected using commonly available technology. Nevertheless, the potential benefit of fault clearing speed and selectivity are more valued in today's arc-flash and reliability conscious environment than ever before. Included in the description herein are some issues associated with traditional protection improvements including pitfalls and, more effective ways to implement zone-based protection to achieve fast fault protection while maintaining selectivity for a broad range of fault magnitudes, system configurations and load types.

Figure 20:
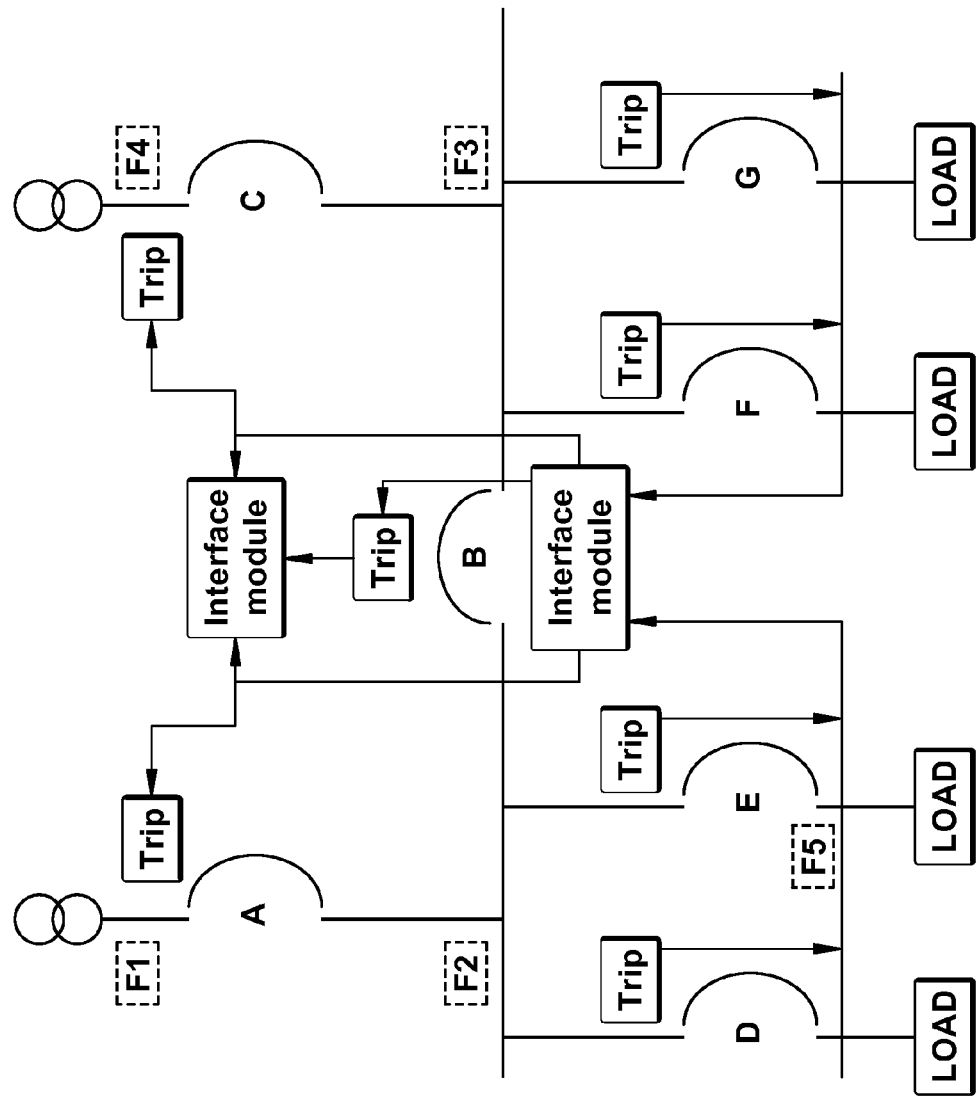
FIG. 20 illustrates a functional circuit block diagram of a prior art time-based coordination relay circuit that could be used in, for example, a ZSI scheme wherein the figure illustrates trip units connected to interface modules.

Low-voltage power distribution systems are expected to deliver reliable power within constraints including, but not limited to, cost and size using available technology. Protective devices are chosen, installed and adjusted to quickly operate, selectively and reliably to protect the low-voltage power distribution system. Protection has traditionally been coordinated by such that for any specific value of fault current (also referred to as overload current or over-current) the downstream device closer to the fault over-current is faster than the upstream device further away from the fault over-current. FIG. 20 illustrates a functional circuit block diagram of a prior art time-based coordination relay circuit that could be used in, for example, a ZSI scheme. The block diagram of FIG. 20 includes trip units connected to interface modules. There is a trip unit corresponding to each main and feeder circuit breaker as well as the tie circuit breaker. The trip units are connected to the interface modules. The mains are fed by a power source, such as, for example, one or more utility generators. The use of trip units and interface modules is an example of communications via analog voltage signal between trip units. The signal is a trip or no trip signal. The phantom squares F1, F2, F3, F4 and F5 illustrate exemplary locations of faults. This time-based coordination can achieve good system selectivity; however, this system selectivity is achieved at the cost of speed for some of the coordinated relays. In a large power system, important main devices (i.e. upstream, source side protective devices such as main circuit breakers) may be significantly delayed to allow time for layers of load side devices to clear selectively. To improve upon time-based coordination the following methods are often used: 1) zone-selective-interlocking, and 2) differential protection (i.e. bus-differential).

There are limitations, and risks of improper operation for these methods. that will also discussed, as well as how to mitigate those risks using the Single-Processor-Concept [1].

Zone-selective-interlocking and differential protection can improve protective device (i.e. speed up protective device operating time). Additionally, clearing speed has an effect on arc-flash energy. There are limitations, and risks of improper operation for these methods that will also discussed, as well as how to mitigate those risks using the Single-Processor-Concept [1].

Figure 1:
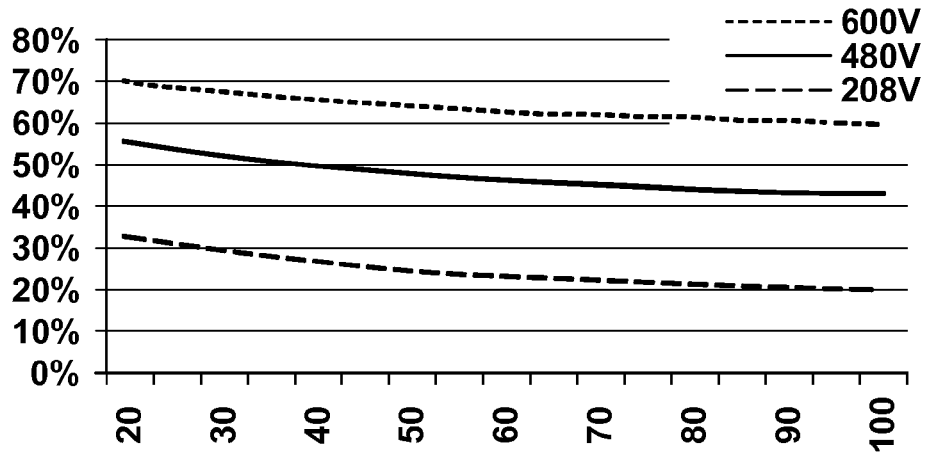
FIG. 1. is a graph of Arcing-Current as Function of Prospective Fault Current, 32 mm Gap, Arc in Box Formula [2].

Impact of Clearing Speed on Protection. Incident arc-flash energy is a technique for calculating damaging heat energy radiated into air from an arc during an arcing fault event and is described in reference [2] titled "IEEE Guide for Performing Arc-Flash Hazard Calculations" (with complete reference information provided supra.). The Guide for Performing Arc-Flash Hazard Calculations [2] reference provides formulas to estimate arcing-current and radiated incident heat energy over a range of working distances under a variety of conditions. The Guide defines arcing-current as a function of available voltage, available bolted fault current and the gap between the current carrying conductors. The calculated arcing-current is less than the available bolted fault current. FIG. 1, titled Arcing-Current as Function of Prospective Fault Current, 32 mm Gap, Arc in Box Formula, demonstrates the relationship of arcing-current to available bolted fault current as a percent at three different voltages for a conductor gap of 32 mm. A 480V arcing-current varies from 43% to 56% available short circuit current for available short circuit current values of 20 kA to 100 kA (FIG. 1 as described in reference [2]).

Arc Flash energy is a function of factors such as: 1) Voltage—Fixed for the system; 2) Available short circuit current—Fixed by system design and source; 3) Working distance—Arms are only so long; 4) Arc gap—Determined by equipment type; 5) Arcing fault clearing time (not short circuit clearing time)—a function of the protective device acting upon arcing current. Therefore, short circuit current is fixed, and cannot change because factors such as voltage, arms or the hot stick are only so long and cannot be changed. Hence clearing time is the only parameter than can be modified. So arcing fault clearing time is a critical factor.

Figure 2:
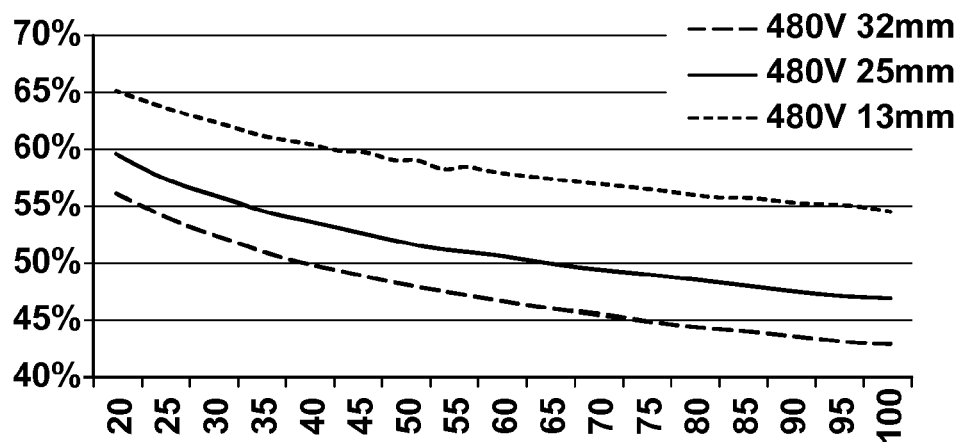
FIG. 2. is a graph of Arching Current as a Function of Prospective Fault Current, at 480 V, HRG, for Various Electrode Gaps [2].

The relationship of arcing-current to available bolted fault current also varies depending on the gap between electrodes. The electrodes represent the current carrying conductors. FIG. 2, as described in reference [2], Arching Current as a Function of Prospective Fault Current, at 480 V, HRG, for Various Electrode Gaps, shows that the relationship can range from 65% at 20,000 A available and a 13 mm gap to 43% with 100,000 A available and a 32 mm gap.

Protective device reaction speed must be considered in relation to the arcing-current present during an arcing fault event. FIGS. 1 and 2 demonstrate that the arcing-current can be a variable percent of the prospective fault current based on multiple parameters identified in reference [2] the Guide. The Guide is based on a series of tests performed under specific laboratory conditions and sets a standard for use of arcing-current values to identify protective device operating speed, and resultant arcing energy: the calculated arcing-current, and 85% of that the calculated arcing-current. Additional variance is possible because the calculated arcing-current formulas are based on calibrated bolted fault currents and specific electrode geometry. Additional unaccounted variance could be caused by system impedance not considered in short circuit calculations such as connections and protective device impedance. Additional variations in the geometry of the conductors involved in the arcing event that differ from those used in the laboratory could create differences between actual and predicted arcing-currents. Defined methodology does not account for the possible variance; however, conservative use of the calculation should, probably, consider additional variance in arcing-current and in incident energy around the values predicted by the calculated arcing-current formulas model.

Other considerations are the sources of fault current, the direction, and path of each fault current contribution. A bus with significant available short circuit current may have a portion of that current come from motor contribution. These various considerations mean the arcing fault current through the main may be surprisingly small. Consider, from Reference [1], the following example, a 62 kA, 4,000 A low-voltage switchgear bus with an estimated 10,000 A of motor contribution through feeders, and estimated 52,000 A of transformer contribution through the main circuit breaker. The potential arcing-current flowing through the main over-current device may be estimated for 480V switchgear as follows:

1) 62,000 A−10,000 A=52,000 A (transformer contribution only)
2) 52,000 A×0.48=25,000 A (From graph in FIG. 2)
3) 25,000 A×0.85=21,250 A (85% to account for arcing-current variance from known bolted currents)[1]

Hence, in a system with a significant value of prospective short circuit fault current the current through the main device for an arcing fault on the main bus may be less than 22,000. If this is a 4000 A bus, the arcing fault current could fall within the tolerance of a 5× pick rating for the main circuit breaker and below 50% the current limiting threshold of a 4000 A Class-L fuse. The main circuit breaker may not consider this a short-time fault.

Additional arcing-current variance could be introduced by incorrect utility information or conservative assumptions in the short circuit current calculations that result in higher calculated fault values than available. The impedance of conductor terminations and protective devices, for example, will introduce impedance not normally taken into account during short circuit calculations. Traditional fault current calculations used to identify the ratings of equipment and components are conservative by making sure that error results in higher, not lower, calculated fault currents. However, when calculating arc-flash incident energy, the more dangerous level of energy may happen with either lower or higher arcing fault values. Greater values of prospective current will yield greater arcing-current that will cause greater incident energy per cycle, however lower arcing fault current values may result in slower protective device operating times that also will increase incident energy.

Potential for low arcing-currents could add significant risk to an arc-flash event. Any device, whether fuses or circuit breakers, that depends on high current values to operate quickly can operate differently from expected if arcing-currents are lower than expected. For large low-voltage-power circuit breakers even short-time pick-up points set to achieve selectivity with the required short-time characteristics of loads in the system may be set above potential arcing-currents.

Figure 3:
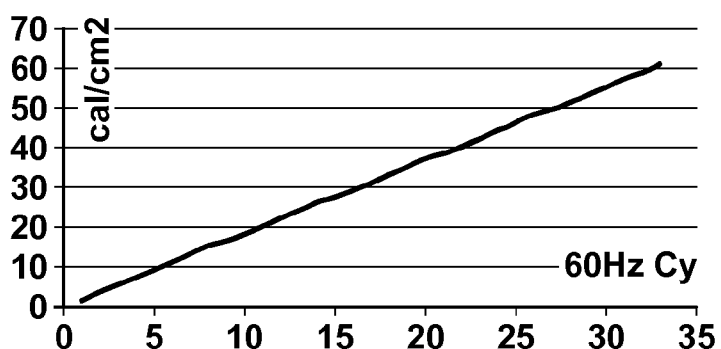
FIG. 3. is a graph of Incident Energy as Function of Clearing Time in Cycles, illustrating that at 480V, HRG, 32 mm, 18", 52 kA Tbf, Arc in Box [2].

Impact of Arc-flash Current on Short-Time Pick-Up. FIG. 3, as described in reference [2], illustrates Incident Energy as Function of Clearing Time in Cycles, 480V, HRG, 32 mm, 18 inches, 52 kA Ibf, Arc in Box. FIG. 3 illustrates a graph of the relationship of calculated energy vs. time in cycles, for a HRG (High-Resistance Grounded) 480 V system with a 32 mm electrode gap and an 18-inch working distance. As the graph indicates a clearing time that exceeds 22 cycles will result in ~40 cal/cm. Above this level, a suitable level of PPE (Personal Protective Equipment) is not available [1].

In the example of FIG. 3, the main circuit breaker set with a short-time pick-up of 5× nominal will have a short-time pick-up band of 18,000 A to 22,000 A. Though it may not be common for a large main circuit breaker to be set this high it may result from similar settings in large feeders and high inrush current. The arcing fault current is calculated at 21,250 A and illustrates that the circuit breaker may clear at its long-time delay instead of the faster short-time delay. Even if this device is part of a zone interlocking scheme, if the current does not exceed the short-time pick-up, the device will not operate within the short-time band. The longer clearing time could result in a significant level of incident arc-flash energy, well above HRC4 (hazard risk category 4). A 4000 A Class-L fuse with a current limiting threshold around 55,000 A would not improve the situation.

Figure 4:
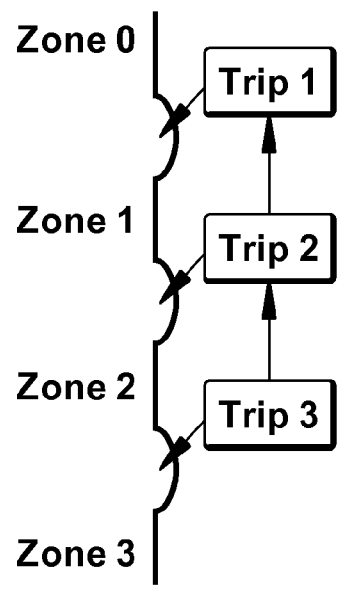
FIG. 4. illustrates a Three Level Zone-Selective-Interlocking System.

Zone-Selective-Interlocking and Motor Contribution: Direction Matters. In zone-selective-interlocking, several levels of circuit breakers operate selectively at their minimum time delay for in-zone short-time faults. FIG. 4. illustrates a Three Level Zone-Selective-Interlocking System. For a series of circuit breakers as shown in FIG. 4 communication is enabled that allows devices to receive blocking signals from devices below and also allows the device to send a signal to the next circuit breaker above. The signal is generated when the circuit breaker senses current that exceeds its short-time (ST) pick-up level. If that circuit breaker also receives a blocking signal, it will operate at a programmed delay. If it does not receive a blocking signal, it will operate at its minimum time delay.

Figure 5:
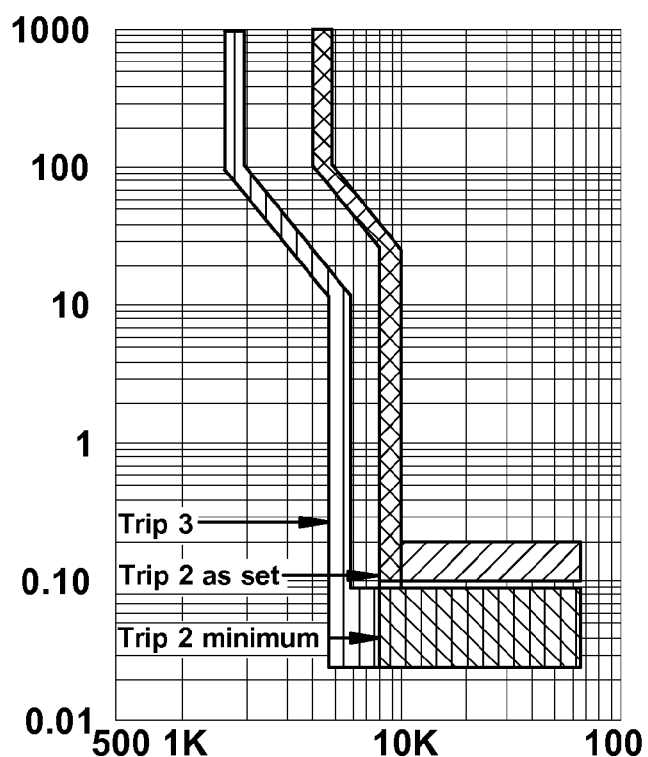
FIG. 5. illustrates a ZSI Effect On Upper Circuit Breaker in a two Circuit Breaker Scheme FIG. 6. illustrates a Bus Fault With Source and Motor Contribution.

FIG. 5. illustrates a ZSI Effect On Upper CB in 2 CB Scheme. Zone interlocking depends on feeder circuit breakers sensing in-zone fault current and sending blocking signal to the mains and ties. The time-current-curve in FIG. 5 demonstrates the effect of zone-selective-interlocking on short-time (ST) operation of two circuit breakers (CBs). If current flows through the feeder to a fault in its zone then the blocking signal will cause the main CB to operate at its set delay above the feeder's clearing time. This ensures fast operation of the feeder while maintaining the main as a back up if the fault current also exceeds the main's short-time pick-up. If the fault occurs on the main bus, the feeder will not see it and the main will operate at its faster time delay and clear in less than 100 milliseconds.

Figure 6:
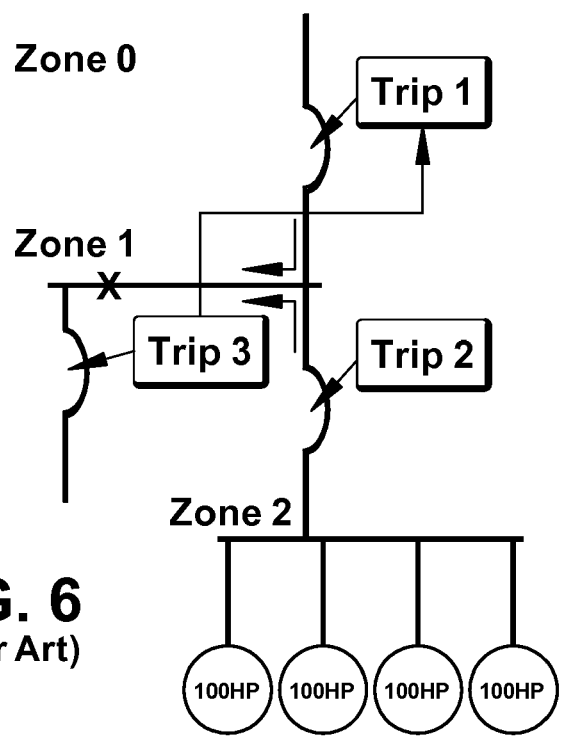

FIG. 6 illustrates a Bus Fault With Source and Motor Contribution. In the system shown an 800 A frame CB is feeding an MCC (Motor Control Center) with four 100 Hp motors. Each motor has full load current of current of 146.3 A and a locked rotor current of 863 A (5.9×FLA). The motors will start individually during expected operation of the system; the 800 A CB is set above 125% of the motor bank's full load current–732 A (146.3 A×4×1.25). The short-time pick-up of the circuit breaker is set to clear 125% of 3 motors FLA (Full Load Amperes)+125% of one motor's starting current ((146.3 A×3+146.3×5.9)×1.25), 1624 A.

Figure 7:
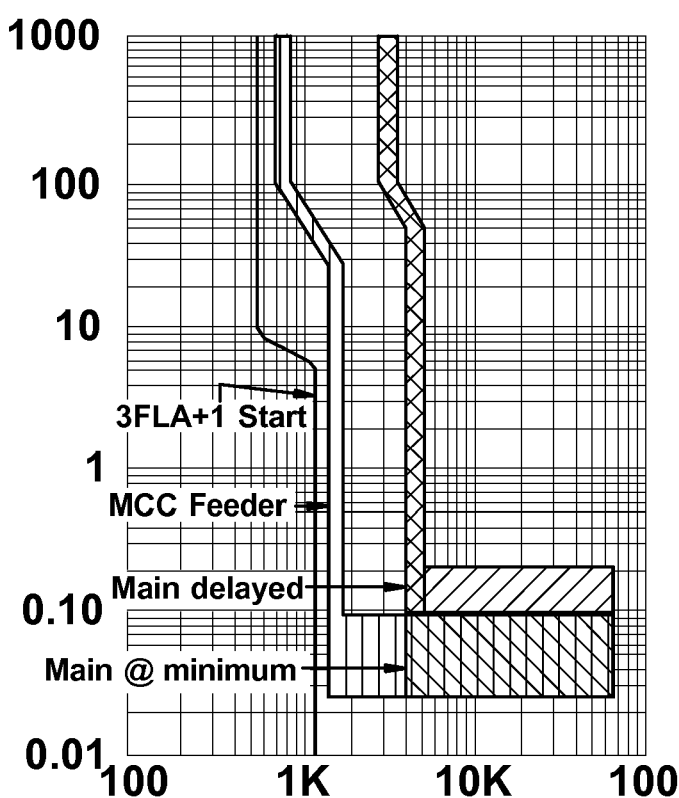
FIG. 7 is the time-current-curve for the feeder, the main (operating in the zone-interlocked mode) and the motor load; the motor load is shown with a 10 second starting inrush for one motor with the other three running at full load.

FIG. 7 illustrates a Feeder set for MCC load, 1 motor start and is the time-current-curve for the feeder, the main (operating in the zone-interlocked mode) and the motor load. The motor load is shown with a 10 second starting inrush for one motor with the other three running at full load.

Figure 8:
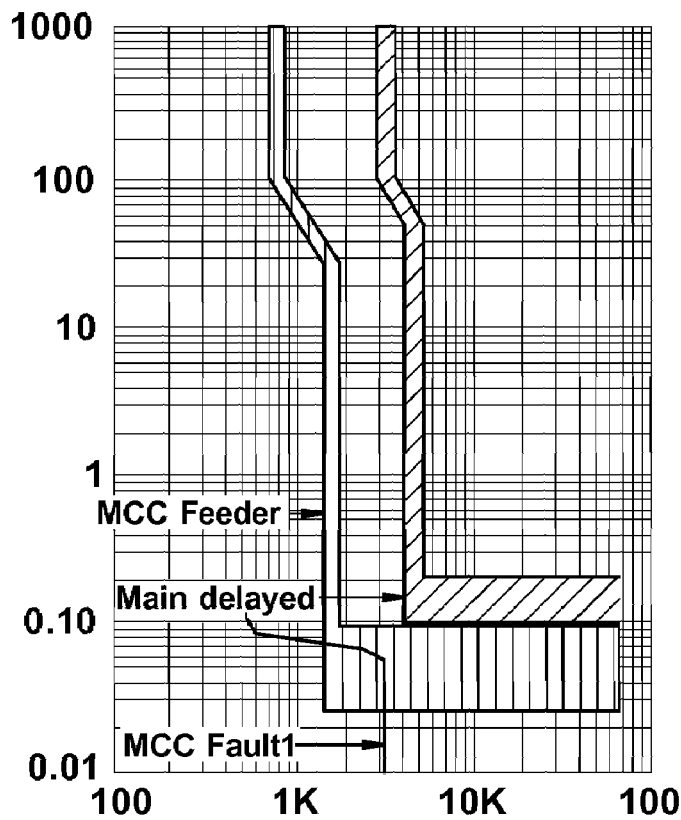
FIG. 8 illustrates the circuit of FIG. 7 where MCC Fault Contribution to Main bus Fault—Main CB Forced to 2 Delay by ZSI Signal From Feeder; under bus fault conditions and the MCC's contribution of short circuit current for 0.1-0.05 second. where the main is reacting more slowly for a fault in its zone of protection than intended by the system designer.

FIG. 8 illustrates MCC Fault Contribution to Main bus Fault—Main CB Forced to 2Delay by ZSI Signal From Feeder. FIG. 8 illustrates the same circuit as FIG. 7 under bus fault conditions and the MCC's contribution of short circuit current for 0.1-0.05 second. The motor contribution is enough to initiate short-time timing in the feeder circuit breaker and hence the feeder circuit breaker will issue an interlocking signal to the main causing it to operate at a delayed time band. The main is now reacting more slowly for a fault in its zone of protection than intended by the system designer. The reverse current caused by the motor contribution fools the feeder circuit breaker into operating as if it is feeding a fault on its load side. The ZSI, in this case, performs exactly opposite from expected.

This risk can be addressed by setting the feeder's delay to a greater value or adjusting the short-time pick-up to a greater value. In either case, some desirable protection is compromised.

In the case of a bus with no low-voltage main, the primary medium voltage transformer protective device main may be zone-interlocked with the feeders. The problem of fault contribution from motors through feeders is equally valid when the main is on the other side of a transformer, and slower than expected operation of the medium voltage device is also possible.

DETAILED DESCRIPTION OF THE PREFERRED EMBODIMENTS

Introduction

Referring now to the drawings, wherein like reference numerals designate identical or corresponding parts throughout the several views, one of the embodiments of the relay with integrated test capabilities of embodiments of the present invention the invention will be described. One of the advantageous aspects of an embodiment of the invention described here is a novel test features integrated into the relay of the present invention so that in test mode the relay of the present invention is a relay under test. The test features use simulated actual data from the power system to test the relay of the present invention. Waveform of present invention is generated based upon user preferences; the user designs signal(s) to inject into the relay. These and other features and advantages will be more clearly understood from the following detailed description taken in conjunction with the accompanying drawings and claims.

Within this description the expression, "functions are run substantially simultaneously" may be used. In the context of the Single-Processor-Device, the statement means that some functions are executed within the same ½ cycle processor operating time such that the result of all the functions executed within the same ½ cycle processor operating time is considered before any circuit breaker command is issued. Hence, multiple functions are processed the substantially same synchronized data and optimize their overall performance. For further elaboration on the system architecture, see U.S. Pat. No. 6,985,784 titled Configuring A Centrally Controlled Circuit Breaker Protection System, invented by Vandevanter; John S., Papallo; Thomas F., Spahr; Ellen E. and assigned to the assignee of the present application and incorporated by reference herein. In addition, the current transformers used in the single-Processor-Concept are not traditional ANSI relay class transformers. The current transformers are referred to as sensors and have secondary currents below 1 Ampere. Their characteristics are incorporated into and compensated for in the processor functions.

Figure 21:
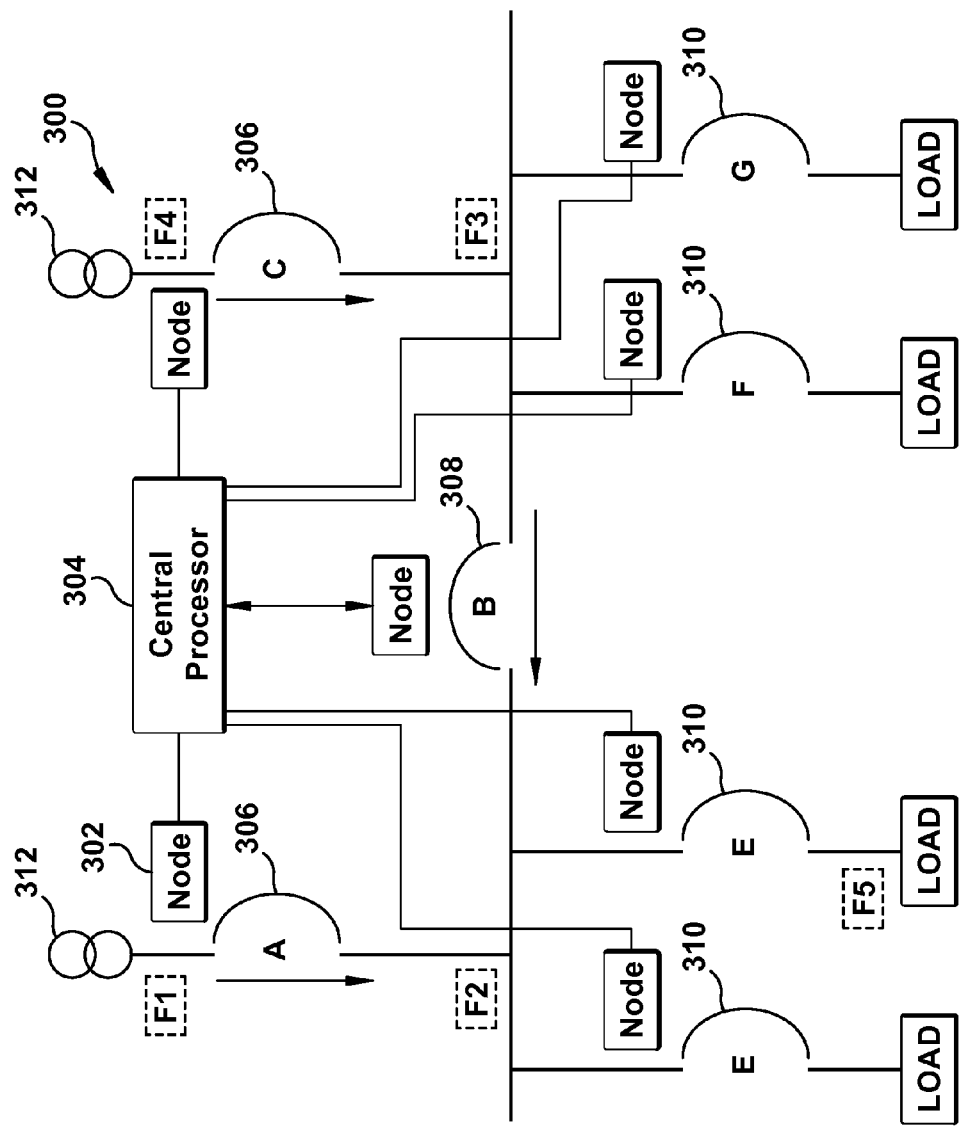

FIG. 21 illustrates a functional circuit 300 block diagram illustrating an intelligent electronic device IED (also referred to as a relay) configured with a central processor 306 or single-processor system. The IED could be used in, for example, a DZSI (Differential Zone Selective Interlocking) scheme to trip circuit breakers 304, 306, 308, 310 connected to the system 304. A node 302 is located at each circuit breaker and interfaces with the central processor to provide node data for processing and decision-making and the like. It should be noted that a node 302, can refer to herein a member, a breaker in a zone, a current source and/or a point where current is measured. In the present system 304, the nodes 302 are points where current is measured. The block diagram of FIG. 21 includes nodes 302 connected to the central processor 304. There is a node 302 corresponding to each main 306 and feeder circuit breaker as well as the tie circuit breaker 308. The nodes 302 are connected to the central processor 304. The mains 306 are fed by a power source 312, such as, for example, one or more utility generators. The phantom squares F1, F2, F3, F4 and F5 illustrate exemplary locations of faults. The use of nodes 302 and a central processor 304 is an example of real-time processing where the node 302 and processor 304 system process signals substantially simultaneously. The signals are, for example, serialized and packetized and hence the analog signal obtained via a CT (not shown) is converted to a digital signal. The scheme illustrated in FIG. 21 could be used, for example to determine relative current directions in order to determine trip decisions and for example, timing. Other determinations could be made by one of ordinary skill in the art.

Figure 9:
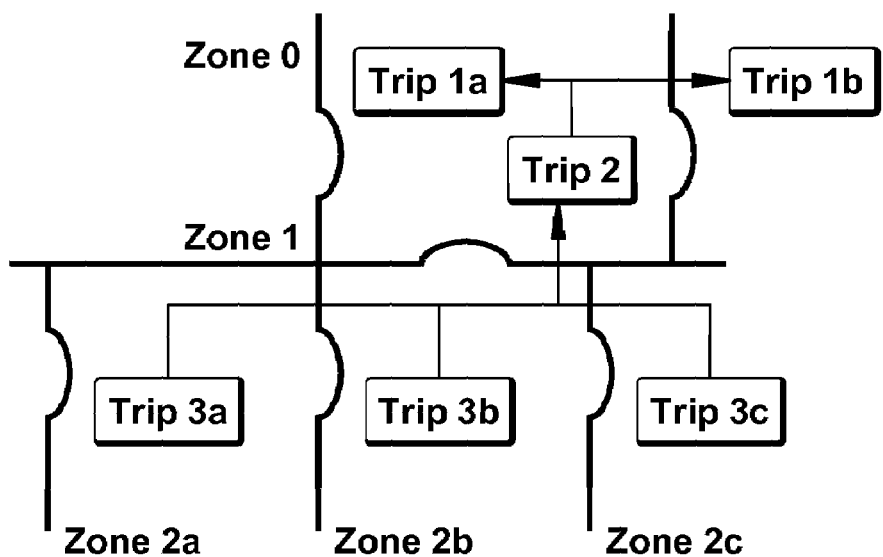
FIG. 9 illustrates a general (may vary by manufacturer) configuration for Zone-Selective-Interlocking With Selective Tie
Figure 10:
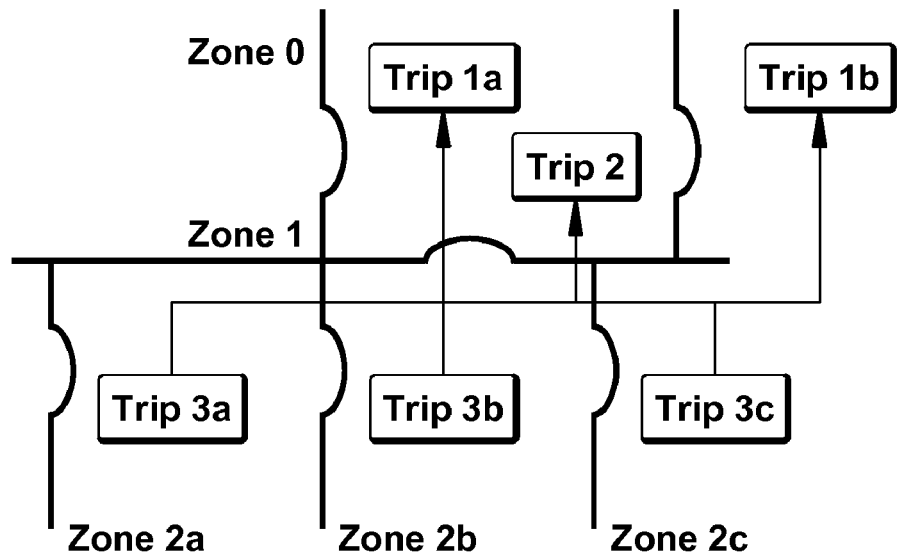
FIG. 10 illustrates a general (may vary by manufacturer) configuration for Zone-Selective-Interlocking With Fast Mains.

ZSI Applications in Multiple-Source Systems with Ties: Selectivity or Protection In distribution systems with tie circuit breakers, ZSI schemes may be configured two different ways; with a selective tie, or with fast mains. FIG. 9 illustrates Zone-Selective-Interlocking With Selective Tie the general configuration (which may vary by manufacturer) for a selective tie and FIG. 10 illustrates Zone-Selective-Interlocking With Fast Mains for fast mains. Both of these schemes may result in a compromise between selectivity and fast protection.

DZSI Theory Of Operation: 1) In an embodiment of the present invention Reverse Current uses voltage polarization to detect and trip main breakers. Reverse current will use "historic" voltage—from for example about 6 to 30 Cycles prior to the fault—for the direction comparison. In the present embodiment, this function does not operate if a main breaker 306 (i.e. main A circuit breaker of FIG. 25) is closed on the gear. Further, in an embodiment of the present invention Reverse current will interact with DZSI because the ZSI tiers need to be "flipped" for a reverse fault. 2) Bus Diff detects and clears lower level in zone bus faults; 3) In an embodiment of the present invention DZSI handles the directional and parallel fault cases; and DZSI interacts with the individual breaker ST functions, changing the delays for improved fault clearing and selectivity based on the fault conditions.

Further, with respect to DZSI Theory Of Operation: 1) In an embodiment of the present invention DZSI operates on a Bus and Zone principle, the same as ZSI multi-point IEDs (or relays) such as, for example Entellisys™, manufactured by General Electric, the assignee of the present invention. Hence, the DZSI operates on CCPU firmware; operates using bus and zone configuration techniques of a multi-point relay; operates using HMI configuration software. A single-processor system provides the platform for current direction to be determined. The embodiment of the DZSI system calculates phasors.

Four fault conditions are detected using DZSI: 1) In zone bus fault; 2) In zone feeder fault that has not caused pickup of the zone; 3) In zone feeder fault that has caused pickup of the zone; and 4) A reverse fault on a main breaker. It should be noted that the four fault conditions are detected using DZSI are distinguished because the timing of the breaker primary and backup trip times are different for the different fault conditions. DZSI Logic is used to distinguish fault types based on several system current tests. The results of the tests determine the fault type. Each test can be determined by one of ordinary skill in the art. A state table can be created with the resulting fault type (i.e. in zone fault, out of zone fault, in zone feeder fault, no fault, in zone reverse fault, in zone bus fault) for each test.

Figure 26:
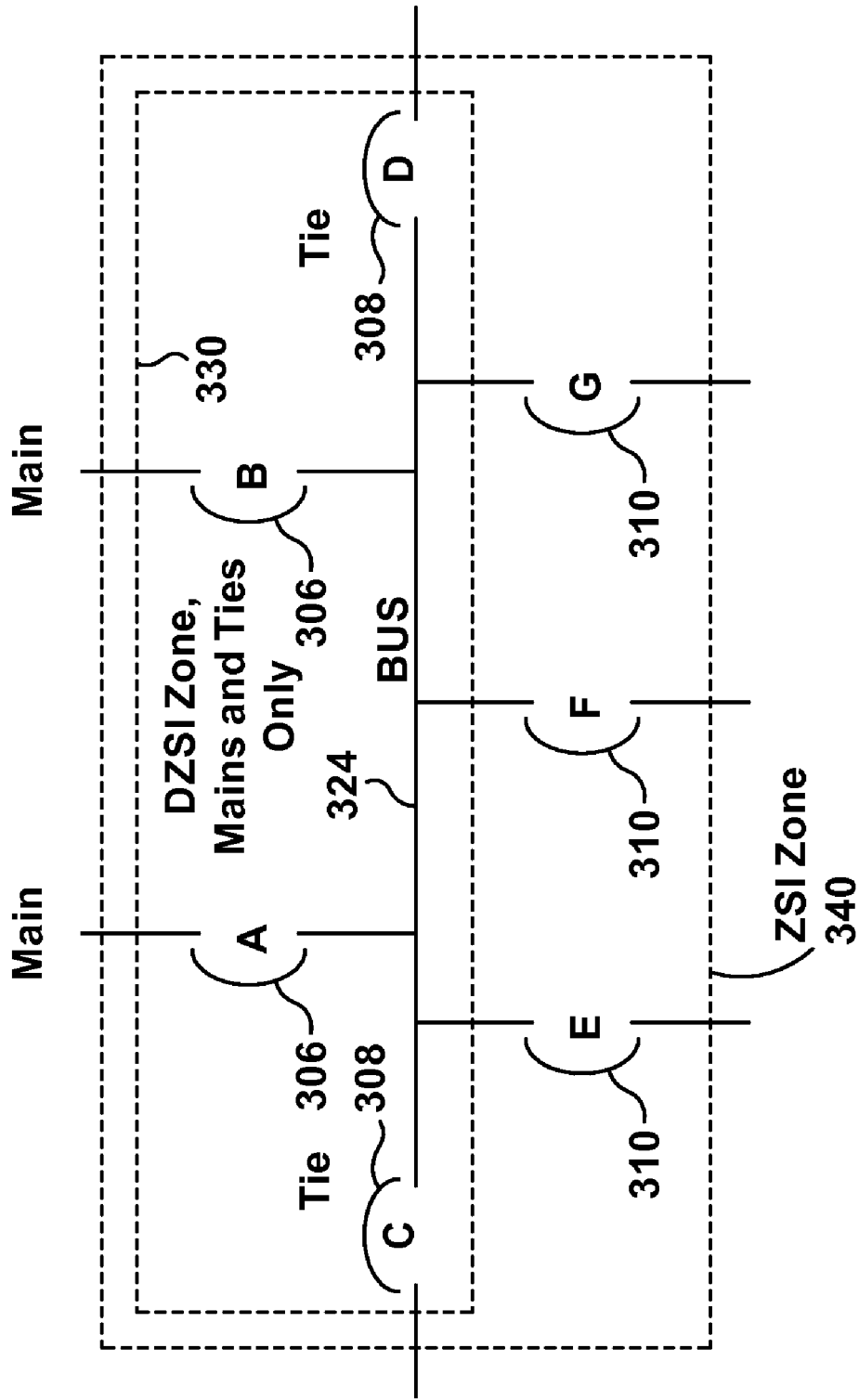
FIG. 26 illustrates a ZSI zone and a DZSI zone within the ZSI zone.

The current tests used to determine the fault conditions for DZSI are: 1) In DZSI Zone Fault; 2) Out of DZSI Zone Fault; 3) Reverse Main Fault; 4) Feeder In Pickup; Feeder Direction. FIG. 26 illustrates an embodiment of a DZSI Zone 330 and a ZSI Zone 340. The DZSI Zone 330 includes the mains A, B, circuit breakers 306 and bus tie C, D circuit breakers 308 at the boundaries of the bus 324 that the DZSI zone 330 function is protecting. The DZSI Zone 330 does not include the E, F and/or G feeder circuit breakers 310 of the bus 324. The DZSI Zone current decisions are based on a Partial Differential Calculation of the main 306 and tie 308 breakers. The ZSI Zone 340 includes all breakers illustrated in FIG. 26. A partial differential zone embodiment is not illustrated in FIG. 26.

The Partial Differential (PD) Calculation is defined as the Phasor Sum of the Main and Tie breakers. Different techniques are used to perform this calculation based on current magnitude. The logic of the DZSI Zone, simplified is: 1) Out of Zone: a) PD determine in/out of zone fault; b) Use Reverse current to distinguish between pass-through and reverse faults; and 2) In Zone: a) PD determine in/out of zone fault; b) Feeder in pickup distinguish between Bus and Feeder faults; and c) Feeder direction is used to determine that the feeder is not feeding a bus fault. In the present invention, main and tie breakers are not restrained as compared to previous protections schemes such as, for example, a ZSI protection scheme which restrains a circuit breaker.

In the selective tie configuration, the feeder circuit breakers on both sides of the tie interlock with the tie. The tie then interlocks with both mains. A fault below a feeder will properly keep the tie and mains operating at a delayed interval while the feeder should clear the fault faster. For a fault on either bus, the tie will delay the mains while it separates the buses. However separating the buses does not clear the fault. Whichever bus is faulted remains faulted until the respective main clears one time delay later. In this scenario the feeders, tie and mains are coordinated, one time delay is saved, but the fault can remain energized for two time delays via one source.

The fast main connection interlocks the feeders with the tie and both main circuit breakers. In this case bus fault will be seen by all three circuit breakers as a fault within their respective zones and all three circuit breakers will trip at a minimum time delay. Fast protection is achieved, however system reliability is sacrificed.

In an ideal system the main and tie feeding the faulted bus would clear in minimum time while the other bus remained connected to its dedicated source.

Zone-Selective-Interlocking and Faults Ahead of a Main Circuit Breaker.

Figure 15:
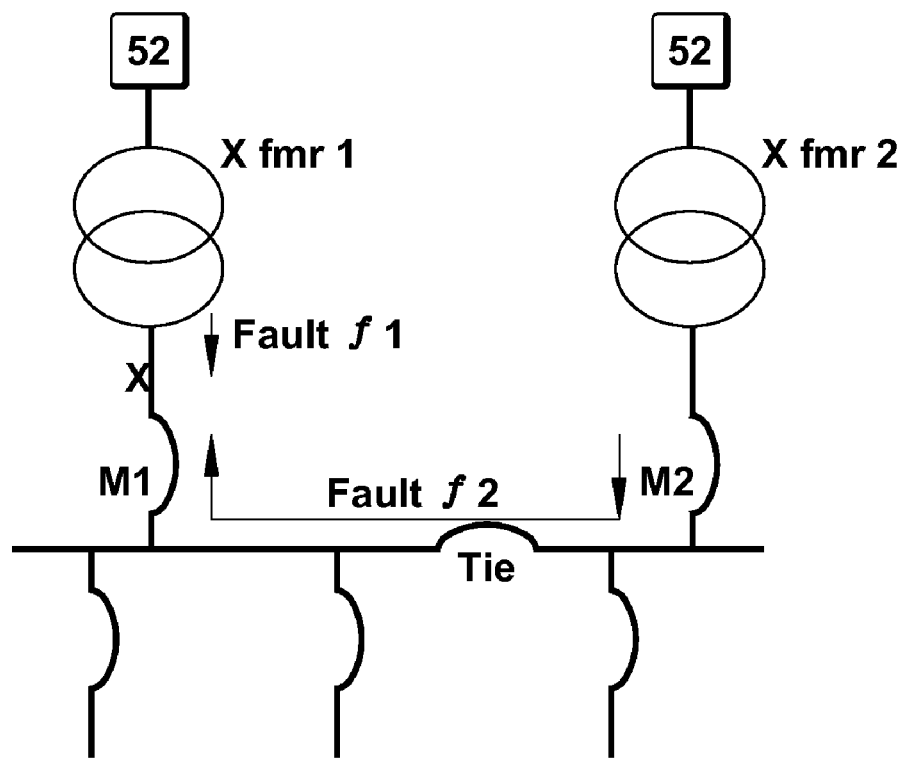
FIG. 15 illustrates Fault Contribution to Fault Ahead of Main where both buses show the tie and main with current flowing in opposite directions indicating a through-fault; to protect this scenario current direction through the main circuit breaker is used.

Most low-voltage power systems will be fed from a transformer via a low-voltage main circuit breaker. A fault detection and isolation problem exists when a fault occurs between the low-voltage main and the transformer secondary terminals. During closed tie operation, with sources in parallel the fault is fed from the other source through the tie and both main circuit breakers (see FIG. 15 infra.). Knowledge of the magnitude of current flow is not enough to identify fault location. In the selective tie configuration shown in FIG. 9 the tie circuit breaker would clear first and properly isolate the fault from the other source, though not from all motor contribution, and would drop at least one bus unnecessarily. However, in the fast main configuration both mains and tie will clear substantially simultaneously, unnecessarily disconnecting both buses from their source.

In an ideal situation, the main closest to the fault should separate the fault from the other source in an about minimum time. The tie, as well, as the other main should remain closed. A medium voltage device should also operate as quickly as possible separating the fault from its primary source. To accomplish this the fault location must be known.

Normal circuit breaker trips with ZSI will not be able to differentiate a fault on the equipment bus from a fault ahead of the bus at either of the transformer terminals. In the present example, three circuit breakers (1a, 2 and 1b) of FIG. 9, circuit breakers see substantially the same fault current contributed by one transformer. In this fault situation the connection illustrated in FIG. 9 will trip the tie with neither main tripping, yet disconnecting one bus from a viable source unnecessarily. In the connection illustrated in FIG. 10 all three circuit breakers trip substantially simultaneously disconnecting both buses from all sources substantially simultaneously.

Zone-Selective-Interlocking and Instantaneous Protection

Figure 11:
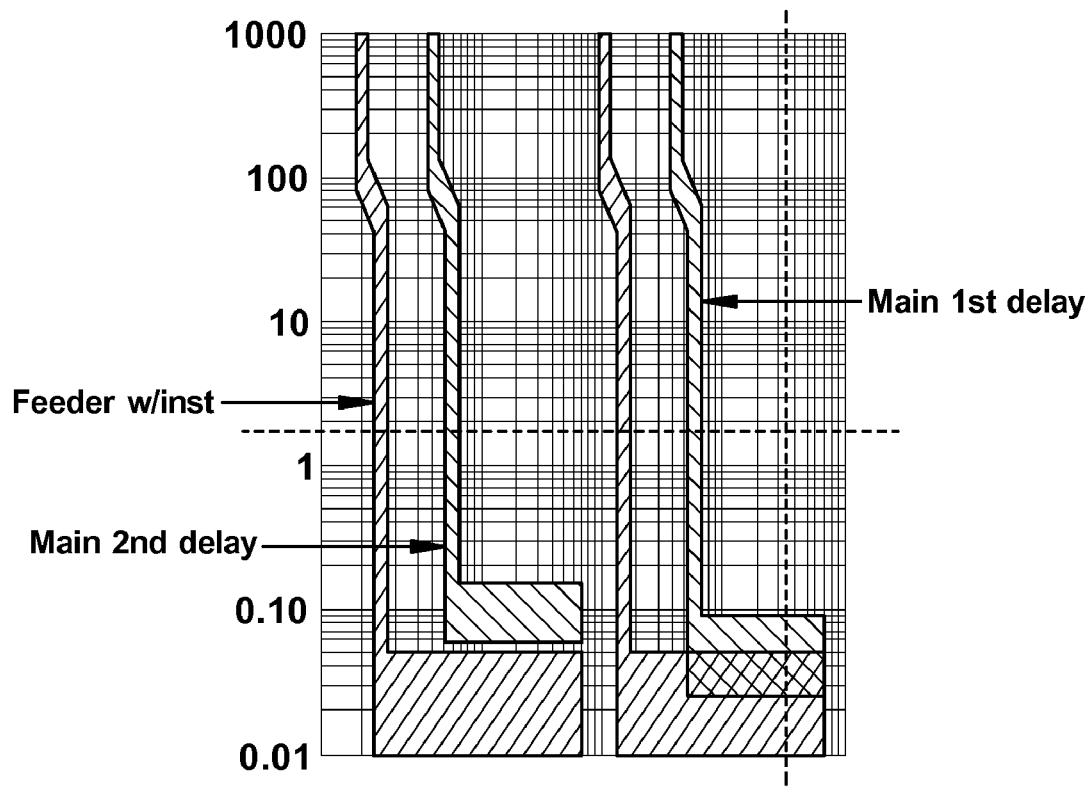
FIG. 11 illustrates a time. Current curve for Traditional ZSI (Left) Above Instantaneous as compared to Faster Implementation (right) Overlapping Feeder Instantaneous

FIG. 11 illustrates Traditional ZSI (Left) Above Instantaneous vs. Faster Implementation (right) Overlapping Feeder Instantaneous. To achieve the fastest protection and minimum of cascaded time delays it is desirable to use a feeder circuit breaker with an instantaneous characteristic set low enough to sense arcing-currents in the protected circuit. Any circuit breaker above may be set at a short-time band to be selective with the feeder circuit breaker. Traditionally the short-time band should be position above the clearing time of the feeder circuit breaker operating instantaneously. With large stored energy devices instantaneous clearing times are usually drawn at 3 cycles (50 ms). The short-time band in the next device would start above 3 cycles as shown on the left side of FIG. 11.

Figure 28:
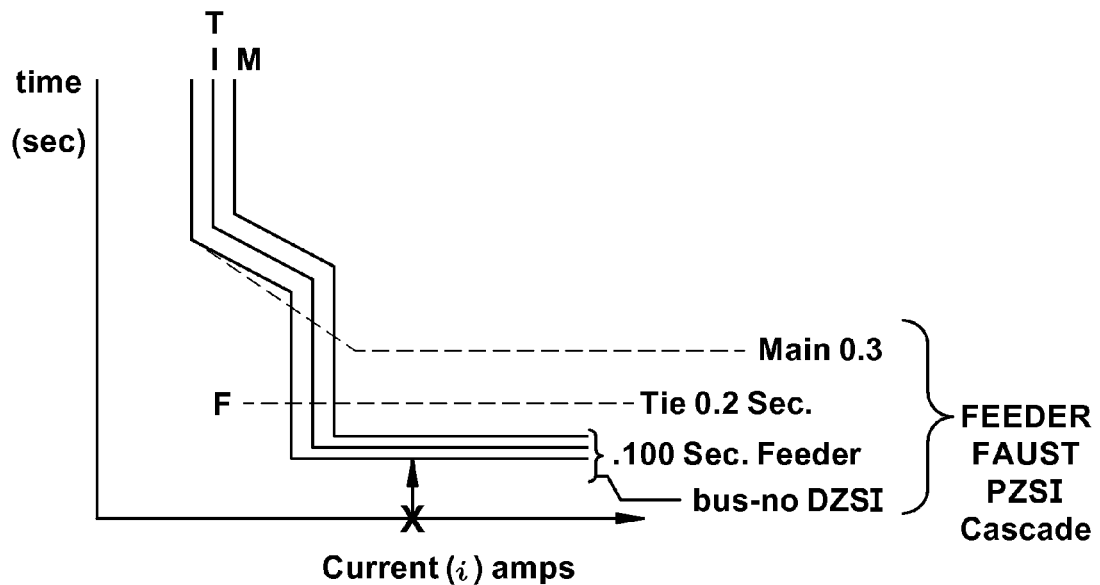
FIG. 28 illustrates a TCC the main, tie and feeder will trip with a cascaded time delay in a PDZ scheme and where, through the use of a DZSI operation, at the same point in time for the main, tie and feeder, the trip operations are substantially simultaneous.

It would be more desirable that the short time delay of the second circuit breaker of FIG. 11 to operate faster and still maintain selectivity with the overlapping instantaneous response of the low-voltage-power circuit breaker below. The right side of FIG. 11 shows two circuit breakers with the main device operating at a faster short-time band that overlaps the instantaneous band of the feeder. Any zone selectively interlocked circuit breakers further upstream would be selectively operating at the same short-time band. This second faster operating mode would be preferable because it results faster protection as long as selectivity can be provided by an interaction of the instantaneous and fast short-time protection. A delay of about 20 to 25 milliseconds is sufficient to be selective with the clearing time of most molded case circuit breakers (MCCBs) operating instantaneously that may be fed through that main device (note that the minimum time delay available may vary by manufacturer). Note the TCC curve of FIG. 28. FIG. 28 illustrates that with the use of PDZ for feeder faults, at 100 ms, for example, the main, tie and feeder will trip with a cascaded time delay. Note however that for a bus fault, where DZSI operates, at the same point in time for the main, tie and feeder, the trip operations are substantially simultaneous.

Bus-Differential Protection

Figure 17:
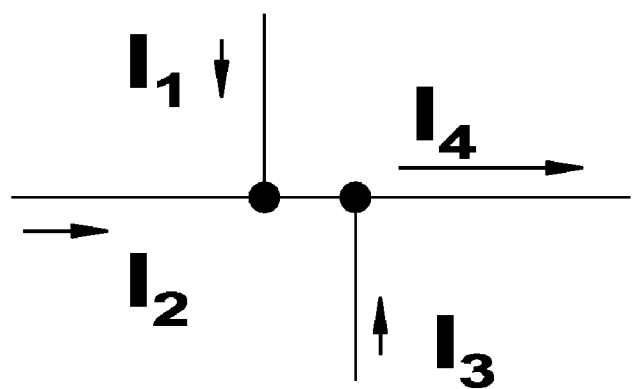
FIG. 17 illustrates. Kirchoff's node law where all the currents into a node equal all the currents out of the node.

Bus-differential protection is based on Kirchoff's node law which states that all the currents into a node (bus) must equal all the currents exiting a node. Kirchoff's node law is illustrated in FIG. 17. In FIG. 17, Kirchoff's node law: all the currents into a node $I_1$, $I_2$, and $I_3$ equal all the currents out of the node $I_4$; and the sum of the currents into and out of the node equals zero, as represented by equation (5) which represents Kirchoff's node law as described by FIG. 17. It should be noted that node, is defined herein to mean a member, a breaker in a zone, a current source and/or a point where current is measured. A bus-differential system is able to calculate fault current subject to the limitations of error in sensing and signal processing. Current transformers (CTs) used in typical medium voltage bus-differential implementation are selected to have relatively linear characteristics up to 20×. Furthermore, dedicated CTs are typically used with the same ratio and are sized to provide sufficient dynamic range for the maximum expected fault magnitude.

$$I_1+I_2+I_3+I_4=0 \qquad (5)$$

Figure 12:
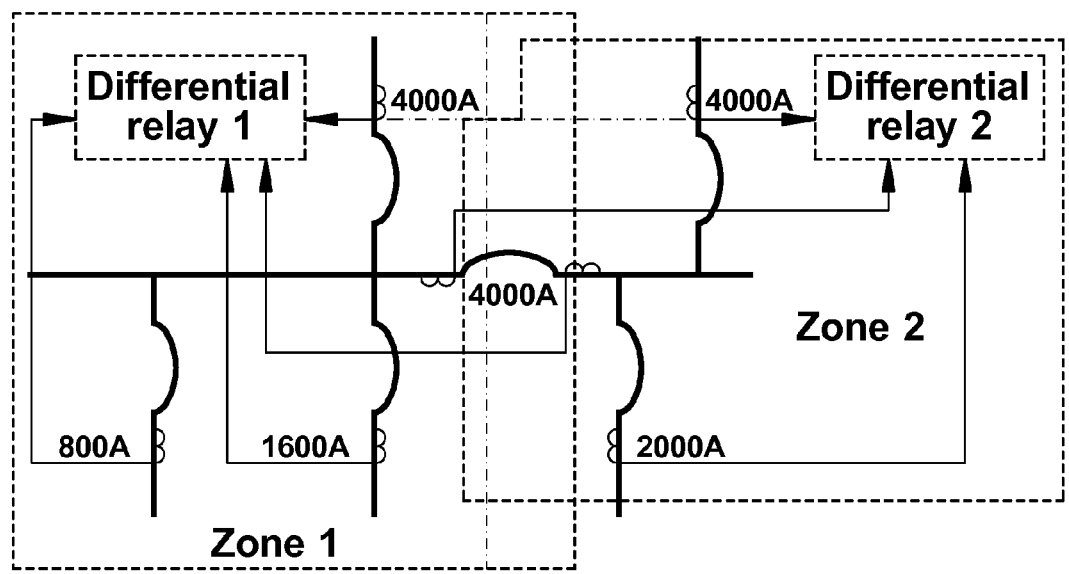
FIG. 12 illustrates a Two Zone Double Ended Substation.

Traditional (prior art) bus protection is performed with dedicated current transformers and a dedicated relay, as illustrated in FIG. 12 titled Two Zone Double Ended Substation. In low-voltage applications, traditional bus-differential protection scheme is customarily regarded as too costly or too complex to consider for bus protection. An implementation using circuit breaker sensors, as can be done with the Single-Processor-Concept [1], may be more cost effective however it may not be able to handle the required dynamic range to maintain nuisance free tripping for some fault magnitudes due to sensor saturation (i.e. CT saturation).

In low-voltage systems bus-differential is advantageous for detection of lower value high-impedance faults that may or may not exceed the short-time (ST) pickup of large main and tie circuit breakers. As fault currents increase, a zone-interlocked system (i.e., ZSI) may provide similar results as a differential system (i.e., DZSI or PDZ). Hence a combination of bus-differential protection and properly set zone selective short-time protection can provide a broad range of selective protection operating in minimum time. The desire would be to properly locate very high-impedance arcing faults to full bolted faults, selectively, and quickly.

The Single-Processor-Concept and Fault Location

The Single-Processor-Concept [1], for circuit protection is a system where a single processor takes pertinent system information and is able to process it substantially simultaneously for a comprehensive line up of power distribution equipment. Since current and voltage information is synchronized and available in one place at the substantially the same time, calculations may be made using substantially simultaneous single time data samples or RMS (Root Mean Square) values calculated over time. The type of data is used depends on what is optimal for the calculation.

Figure 13:
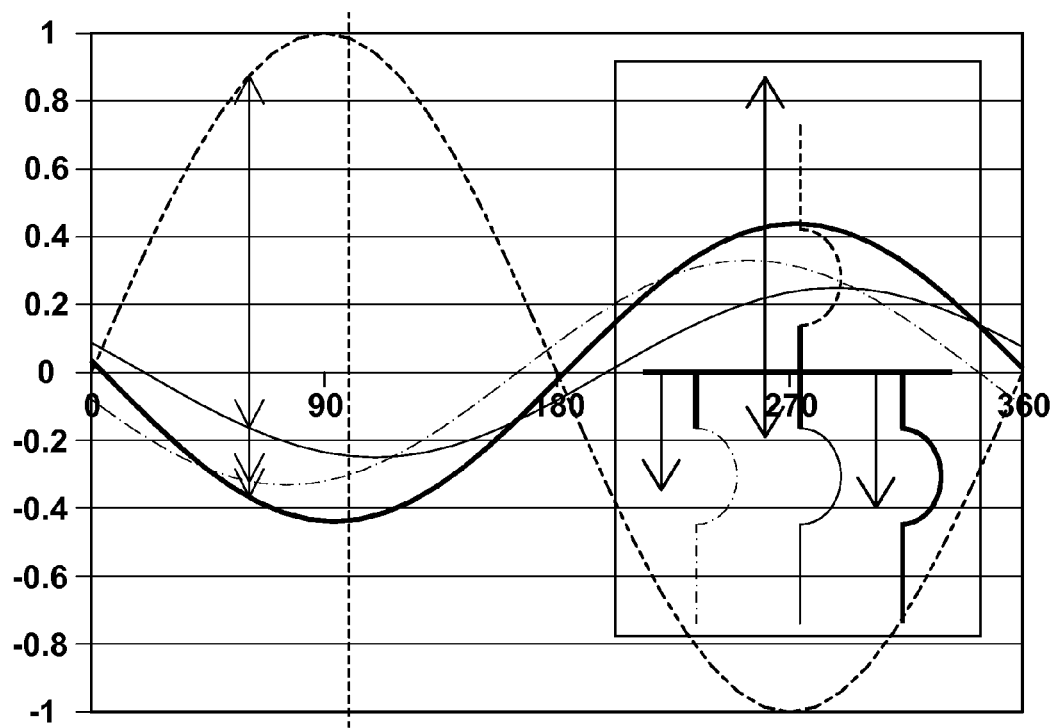
FIG. 13 illustrates Simultaneous, Instantaneous Values of Four Waveforms Available Through Simultaneous Sampling where four instantaneous (single data sample) values for the four currents in a simple radial system can be used to calculate the differential current for the bus at every data sample.

FIG. 13, titled Simultaneous, Instantaneous Values of Four Waveforms Available Through Simultaneous Sampling, demonstrates how four substantially instantaneous (single data samples) values for the four currents in a simple radial system can be used to calculate the differential current for the bus at each data sample. Proper assignation of polarity allows a differential calculation to be made with each data sample using current magnitude only. The calculations can be corrected for expected signal and processing error. Empirical data shows that by using this method and iron core current transformers, resolution for fault currents below the rating of the bus being protected can be achieved. Performing the calculation for a length of time such as 1 or 1.5 cycles allows sufficient calculations to be made to confirm, with a high degree of certainty, the magnitude and location of the fault current.

The single-Processor-Concept allows the use of the same circuit information for a variety of protective and control calculations or systems such as bus differential without the need for single function dedicated devices. Hence, the same hardware providing normal over-current, ground fault and zone-selective-interlocking, can provide bus-differential protection substantially simultaneously.

Combining Bus-Differential and Zone-Selective-Interlocking: Wide Range of Fault Detection A differential system that functions to where any current transformer in the circuit measures 10 times rated current is sufficient for low-voltage applications. The bus-differential function can be complimented by the short-time zone-selective-interlocking scheme. The combination provides fault sensing and location information over the complete expected fault range. Limiting the differential calculations to a range where the measured currents do not exceed 10 times the rated current of any CT in the system keeps the calculation within the linear range of the transformers.

For example, a 4,000 A bus with 4,000 A mains and tie would have over 40,000 A of fault current through either the main or the tie before the bus-differential system would be suspended. In a situation where a fault is below a 1,600 A feeder, fault current through the feeder must exceed 16,000 A for the bus-differential system to be disabled. In either or these situations, the current is large enough to engage the short-time (ST) pick-up of the circuit breakers in order to isolate the fault well and, to reach 10× for 1.5 cycles a forward fed fault from a significant source, not reverse-fed motor contribution, would be needed.

Method for Detection of Current Direction in Faulted Systems with Multiple Fault Current Sources: Relative Direction.

Figure 14:
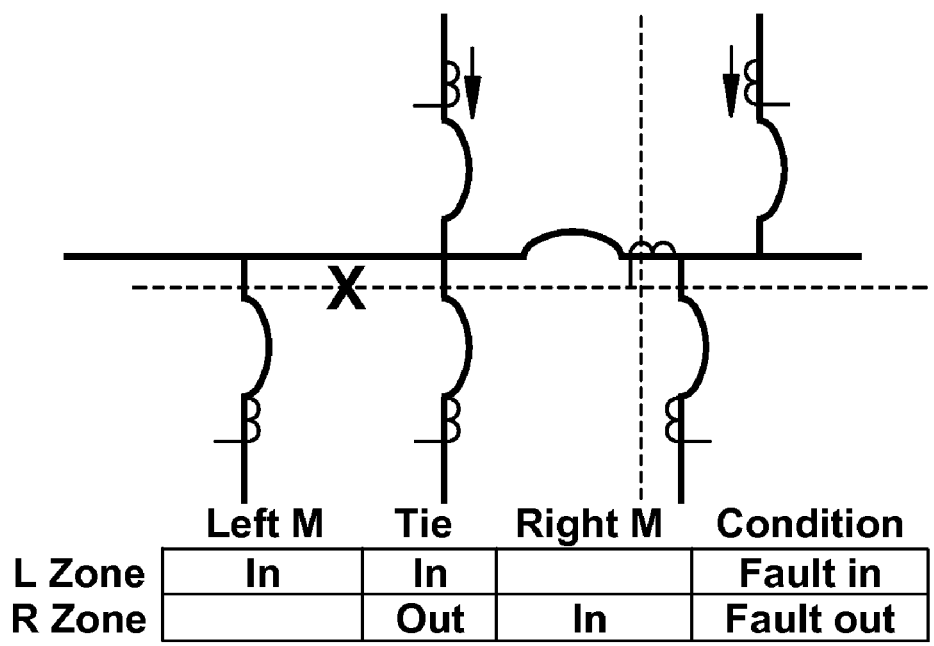
FIG. 14 illustrates . Fault Current Contribution for Left Side Fault; the left main, and the tie flowing towards the bus, hence identifying a fault on the main bus.

To address potential issues created by motor contribution or closed tie operation with multiple sources the zone-selective-interlocking system would need to identify relative fault current direction. Traditional implementations of zone selective operations are not able to do this. Sufficient identification of fault current direction can be achieved in the single processors system because faults currents can be compared to each other. Since the intent is to identify relative direction, the exact angle or magnitude is not used, and significant error can be accommodated without loss of key directional information. To address the problem of which side of the tie a fault is located a method similar to a partial differential calculation may be used. A partial differential calculation uses the mains and ties thereby minimizing cumulative error caused by many small current transformers associated with the feeders. Current direction may be defined as inward (+1) for current flowing towards the bus, or outward (−1) for current flowing away from the bus. FIG. 14 titled Fault Current Contribution for Left Side Fault illustrates the current flow from the left main towards the bus, and the tie current from the right of the tie breaker flowing towards the bus. This identifies a fault on the main bus, (+1) for main current and (+1) for tie current which are both flowing towards the bus. The right bus has one current flowing in (the right main current (+1)), and one current flowing out (the tie current (−1), hence the right bus is not the faulted bus.

In the situation where a single feeder circuit breaker goes into short-time (ST) trip pick-up timing in addition to the main and ties the direction of that feeder's current can also be compared to the main's current direction and tie's current direction. If the current is determined as inward then the fault is in the bus. If the fault current in the feeder is opposite the current direction of the current in the main and tie then the fault is a through-fault fed by the feeder.

In case two feeders reach substantially simultaneous short-time (ST) pick-up timing both, may feeder currents be determined to be flowing in the same direction as the main and tie currents, i.e. inward; the situation indicates that the fault is in the bus. If one feeder current is flowing inward and the other feeder current is flowing outward then the fault is on the load side of the one feeder with current flowing opposite all other excessive currents.

The situation where two feeders are substantially simultaneously feeding separate faults on their load side is improbable. However, it would not result in a lack of tripping. The directional logic can identify that neither is flowing in the same inward direction as the main and tie and hence both feeders should trip.

Partial Differential Zone.

The specific method used to determine current direction and circuit breaker trips, considers each zone a Partial Differential Zone (PDZ) using only ties and mains. Equation (1) is be used when any CB in the PDZ is identified as having current in excess of its short-time threshold.

$$I_r = \sum_{1-p} I_M - \sum_{1-q} (I_T * D_T) \tag{1}$$

Where $I_r$ is the residual for the Partial Differential Zone, $I_M$ is the current for the main, $I_T$ is the current for the tie and $D_T$ is the reference direction unit vector for the tie. The reference unit vector is designated such that if the tie and main current flow towards the bus, equation (1) adds the two currents. The symbols p and q represent the number of mains and ties feeding the Partial Differential Zone, respectively. $I_r$ is compared to a minimum threshold such as, for example, 1.5 times the largest CT in the zone (usually the main). When $I_r$ exceeds this threshold the fault is in the zone or is fed by the zone.

In the case that one or more current readings exceed 10× their respective CTs, a test is performed to determine a large reference phasor for each phase current. Then, the other currents in short-time (ST) pick-up are compared to those large reference phasors for each phase current to determine relative direction.

In the case that the current readings are less than or is equal to 10× their respective CTs, a test is performed to determine a large reference phasor for each phase current. Then, the other currents in short-time (ST) pick-up are compared to those large reference phasors for each phase current to determine relative direction. The test uses the following equations (6) and (7):

$$I_r = \sum_{1-p}(I_M * D_M) + \sum_{1-q}(I_T * D_T) \quad (6)$$

$$I_R >= 1.5 * \text{Max}(CT) \quad (7)$$

The following relative current direction flow test can be performed for each of the breakers that evaluates to true. The test shall include breakers providing reference phases. First a difference of angles between the reference breaker and breaker under the test shall be calculated as follows:

$$\Delta\theta = ang(I)*D - ang(I_R)*D_R \quad (8)$$

Where, in equation (8) ang(I) and ang($I_R$) are angles of the faulty phase of breaker under the test and the reference phase respectively. Also in equation (8), where D and $D_R$ correspond to direction settings for the breaker under the test and the breaker of the reference phase respectively For each phase, a reference current and angle is chosen, where $-I_\beta$ is the reference current and ang($I_\beta$) is the angle. Whether other fault currents for that phase in the Partial Differential Zone are the same is identified by first computing the angular difference between a faulted breaker in the zone and the reference faulted circuit breaker via equation (2) below. In equation (2), $I\alpha$ is the phase current in the circuit being considered and $\Delta\theta$ is the angular difference.

$$\Delta\theta = ang(I_\alpha) - ang(I_\beta) \quad (2)$$

Equation (2) is calculated and once a reference phasor is found for each phase, the phasor for current in each phase of each breaker in the Partial Differential Zone that exceeds a defined current threshold is compared. The angular difference $\Delta\theta$ is checked evaluated to determine if the currents are flowing similarly, into the bus, where current flowing into the bus is defined as IN or INWARD and assigned a Boolean number 1 and current flowing out of the bus is defined as OUT or OUTWARD and assigned a Boolean number 0. The logic can handle significant angular error because the expected angular difference is 180° for opposing currents. If the angular difference is between ±60° from 180°, the currents are considered to be in opposite directions.

Figure 22:
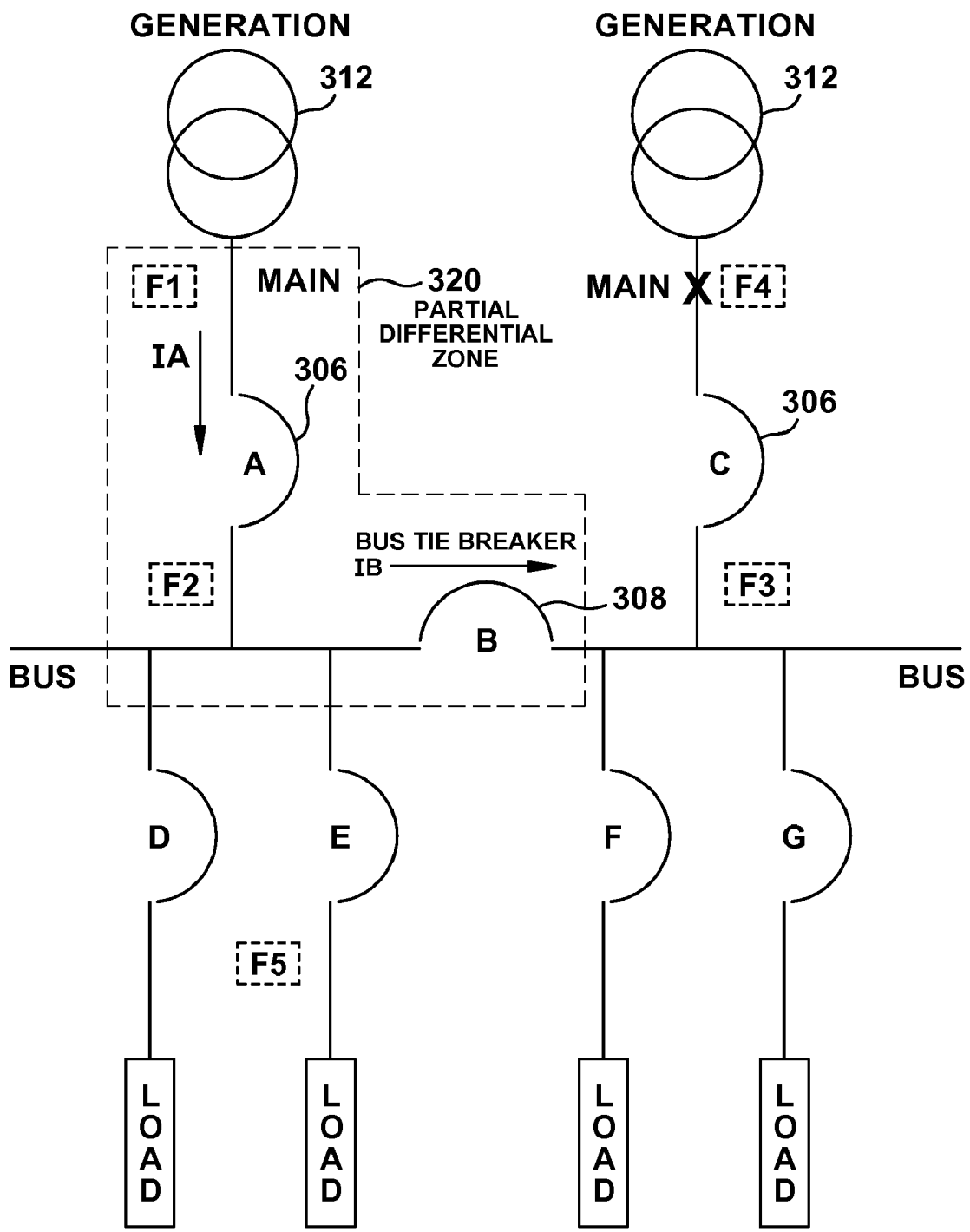
FIG. 22 illustrates an out of zone fault located at position F4, where since IA and IB are flowing in different directions, the fault at F4 is an out of zone fault shown with an X adjacent to F4.
Figure 23:
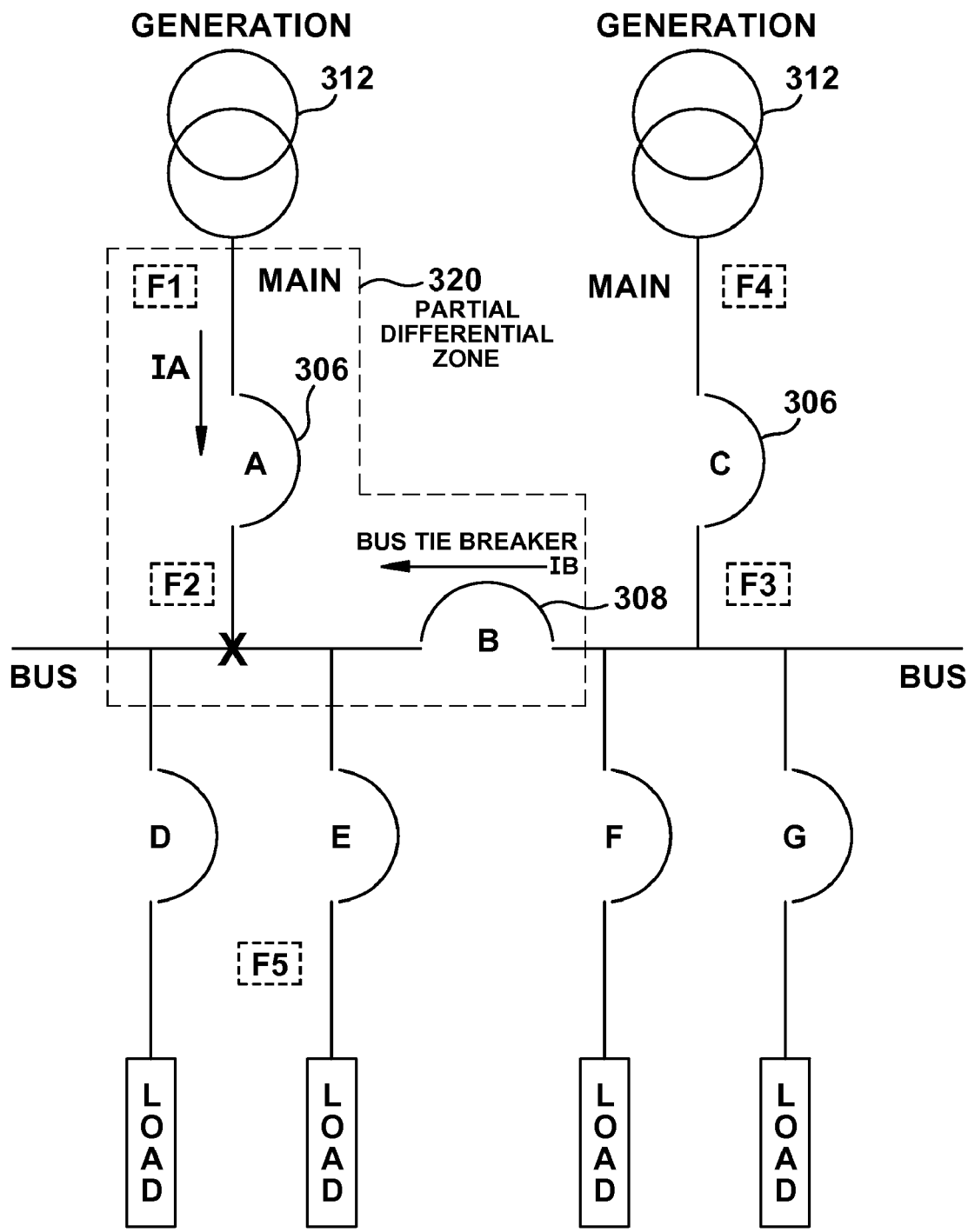
FIG. 23 illustrates the in zone fault located at position F2, where since IA and IB are flowing in the same direction, the fault at F2 is an in zone fault shown with an X adjacent to F2.

FIGS. 22 and 23 illustrate the Partial Differential Zone 320 concept, for analyzing current direction, for an out of zone fault and an in zone fault, respectively. In each figure, the Partial Differential Zone is defined by a dashed line 320 around main A circuit breaker 306 and bus tie B circuit breaker 308.

FIG. 22 illustrates the out of zone fault located at position F4, where the fault is illustrated with an X adjacent to F4. In the out of zone fault situation of the present example, current IA flowing through the main A circuit breaker 306 (from source 312 and into the Partial Differential Zone 320) is assigned a 1 to indicate its INWARD, or into the zone, direction. Additionally, for the out of zone fault situation of the present example, current IB flowing through the bus tie B circuit breaker 308 (i.e. through bus tie breaker 308 and out of the Partial Differential Zone 320) is assigned a 0 to indicate its OUTWARD, or out of the zone, direction. In summary, IA is assigned a 1 and IB is assigned a 0; since IA and IB are flowing in different directions, the fault at F4 is an out of zone fault (i.e. outside of the Partial Differential Zone).

FIG. 23 illustrates the in zone fault located at position F2, where the fault is illustrated with an X adjacent to F2. In the in zone fault situation of the present example, current IA flowing through the main A circuit breaker 306 (from source 312 and into the Partial Differential Zone 320) is assigned a 1 to indicate its INWARD, or into the zone, direction. Additionally, for the in zone fault situation of the present example, current IB flowing through the bus tie B circuit breaker 308 (i.e. through bus tie breaker 308 and into the Partial Differential Zone 320) is assigned a 1 to indicate its INWARD, or into the zone, direction. In summary, IA is assigned a 1 and IB is assigned a 1; since IA and IB are flowing in the same direction, the fault at F2 is an in zone fault (i.e. inside of the Partial Differential Zone).

It should be noted however, that since this is a Partial Differential Zone system additional consideration is given to feeders in order to determine if the fault is in the zone or fed through the zone. To determine whether the fault is in the zone or fed through the zone, the current of feeders fed from the bus and that are in short-time pick-up, is considered. For example, if the current through the feeder is determined to exceed 10× (a value that is by design above potential motor contribution) then the fault is determined to be downstream of the feeder. If the current is in a range defined as below 10× and above the feeder's short-time pick-up then the direction of the feeder's fault current is determined to properly locate the fault. Values in the defined range yield reliable results. Note also that a reason for use of a partial differential zone (PDZ) is that the mains and feeders of the PDZ can have different ratings i.e. 5:1, 6:1, 20×Max; and the feeder breakers can have 100×Max rating. However, the feeder breakers at this rating would likely not read current accurately enough to determine direction.

Figure 24:
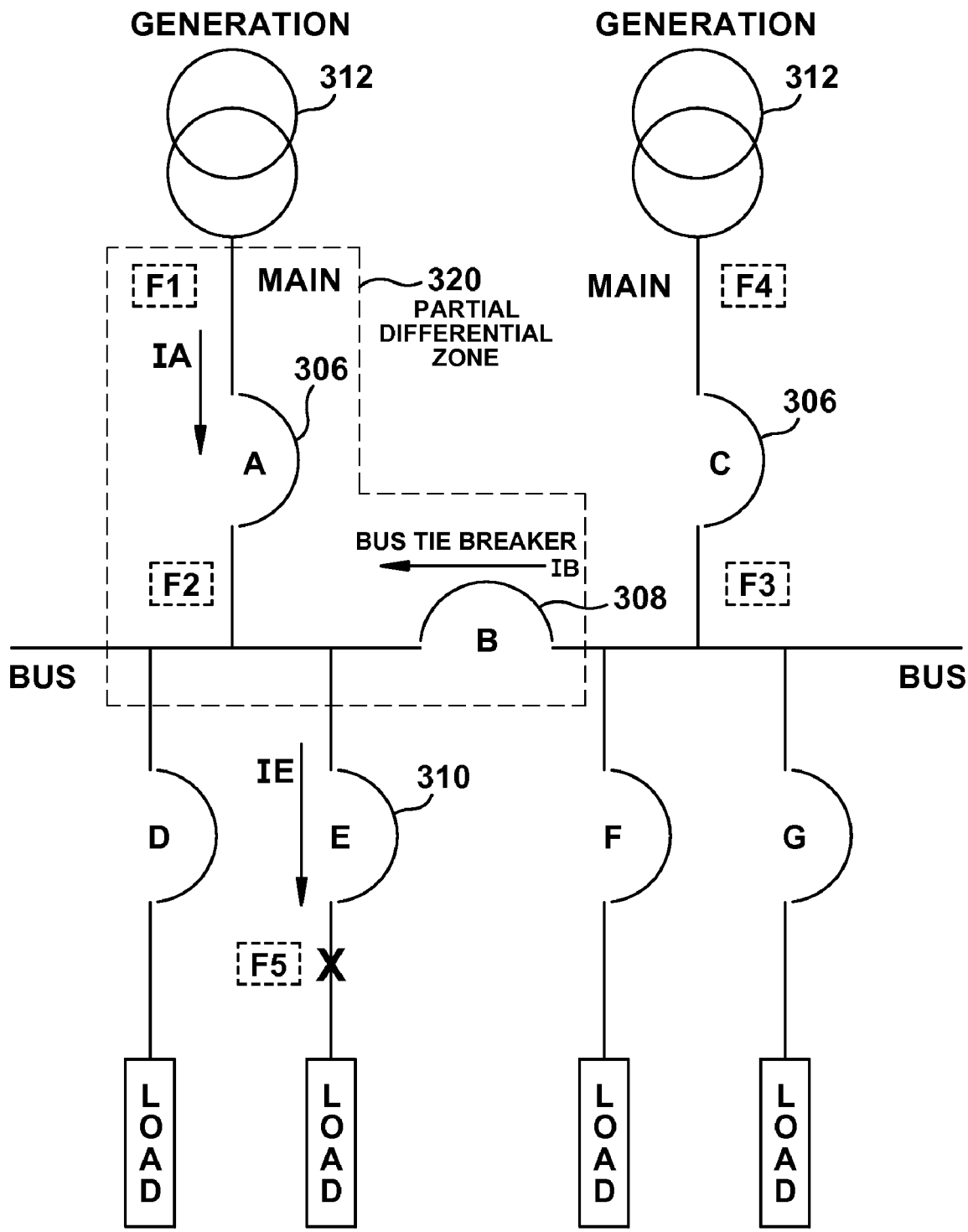
FIG. 24 illustrates the details of determining whether the INWARD or in zone fault is a feeder fault, and not in the partial differential zone 320.
Figure 25:
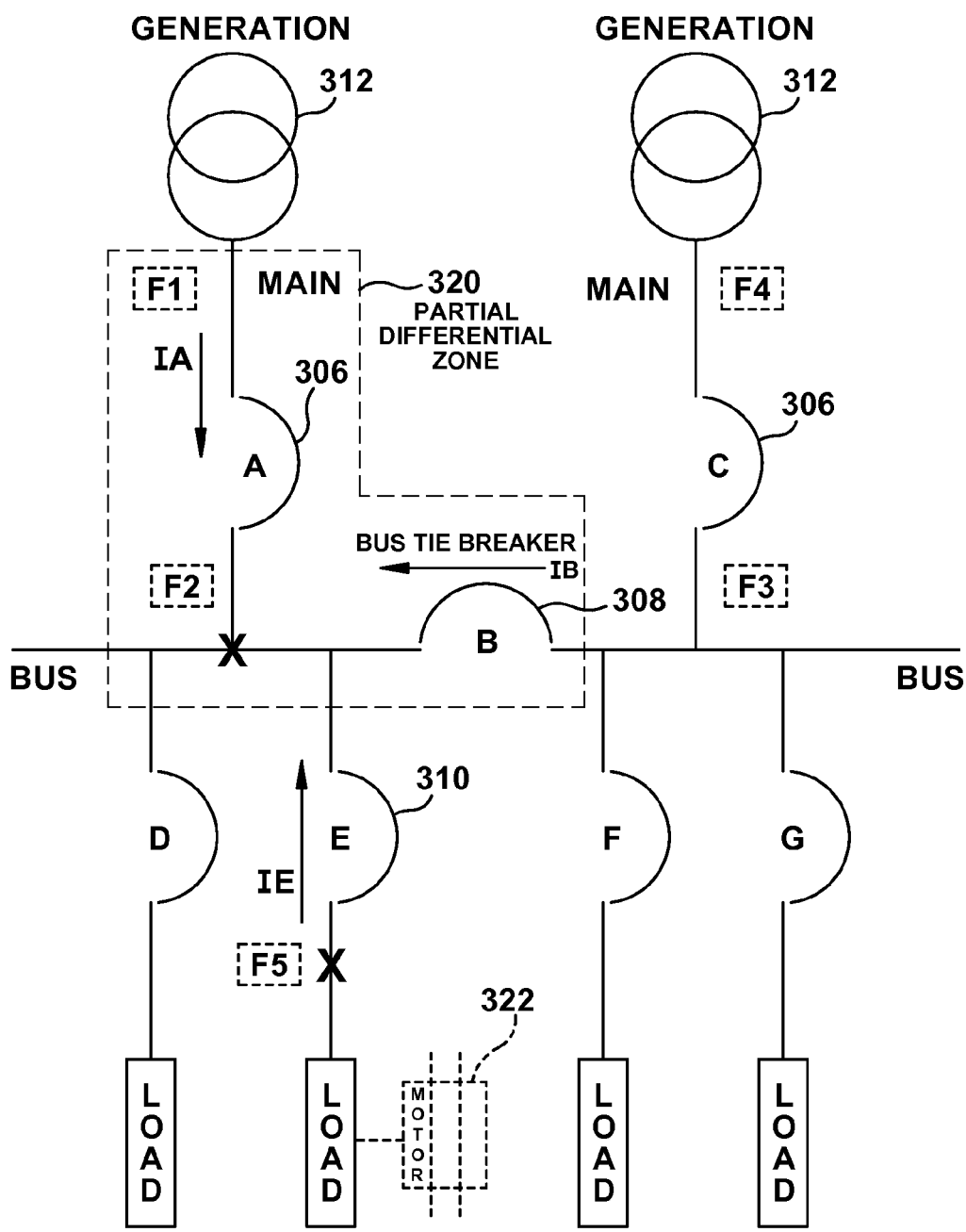
FIG. 25 illustrates additional details of determining whether the feeder, Feeder E, current IE is flowing into the partial differential zone, then the fault is an in-zone fault, at location F2 location.

FIGS. 24 and 25 illustrate the feeder contribution considerations of the Partial Differential Zone 320 system when the results of the in zone fault, such as that of FIG. 23 show that the currents IA and IB directed into the zone (as is the case of IA and IB of FIG. 23). Next, FIG. 24 illustrates the details of determining whether the INWARD or in zone fault is a feeder fault, and not in the partial differential zone 320. If the feeder, Feeder E, current IE is flowing out of the partial differential zone 320, then the fault is an out of zone fault, at F5 location (load side of the feeder E circuit breaker 310) of FIG. 24.

FIG. 25 illustrates additional details of determining whether the feeder, Feeder E, current IE is flowing into the partial differential zone 320, then the fault is an in-zone fault, at location F2. For the in zone fault, with IE contributing, IE is substantially motor contribution current; when the load on a feeder is a motor, as is shown by motor 322 in phantom lines on feeder E, during in-zone 320 fault conditions, the motor load generates current IE feeding the fault at F2 in the partial differential zone 320. An embodiment of the present invention performs partial differential zone 320 protection by determining relative current directions (as opposed to voltage polarization which is more difficult to determine or calculate). The benefits of the relative current direction method include 1) current does not collapse during faults events (whereas voltage used in voltage polarization, collapses during fault events); 2) power factor is removed from the determination of direction; and 3) fault type or angle due to fault type is not used to determine current direction (whereas in other calculations, for example, a phase-to-phase 30° fault that was previously used in another method is not used so the 30° angle does not need to be used in the determination). All of these benefits simplify the determinations of an embodiment of the present invention.

As is explained above, to determine the relative direction of a feeder's fault current, the feeder fault current is compared to a reference phasor where the reference phase represents the IN current for the respective faulted Partial Differential Zone. The phasor representing each phase current for every faulted feeder fed by the faulted Partial Differential Zone is compared looking for a difference in direction that is in a range defined as between 180° and 60°. If a directional difference is determined and the difference is within the defined or predetermined range then the feeder is carrying current towards a downstream fault; however if the angular difference is outside of this range then the feeder is carrying motor contribution current towards the main bus. Once this comparison is made for the faulted feeders it can be determined if one feeder is feeding a fault in its zone of protection or if multiple feeders are carrying motor contribution current towards a bus fault.

Once the determination is made of what each CB in the zone is carrying, 1 the proper circuit breakers can be opened (tripped), (i.e. one main, a main and a tie, or several sources into a bus including motors). Proper back up circuit breakers can be identified and operated if backup suits the fault location, magnitude and system configuration at the time of the fault. This can be done in substantially the same time frame that a short-time calculation can be made for a single circuit breaker, as quickly as, for example, 1.5 cycles.

Figure 27:
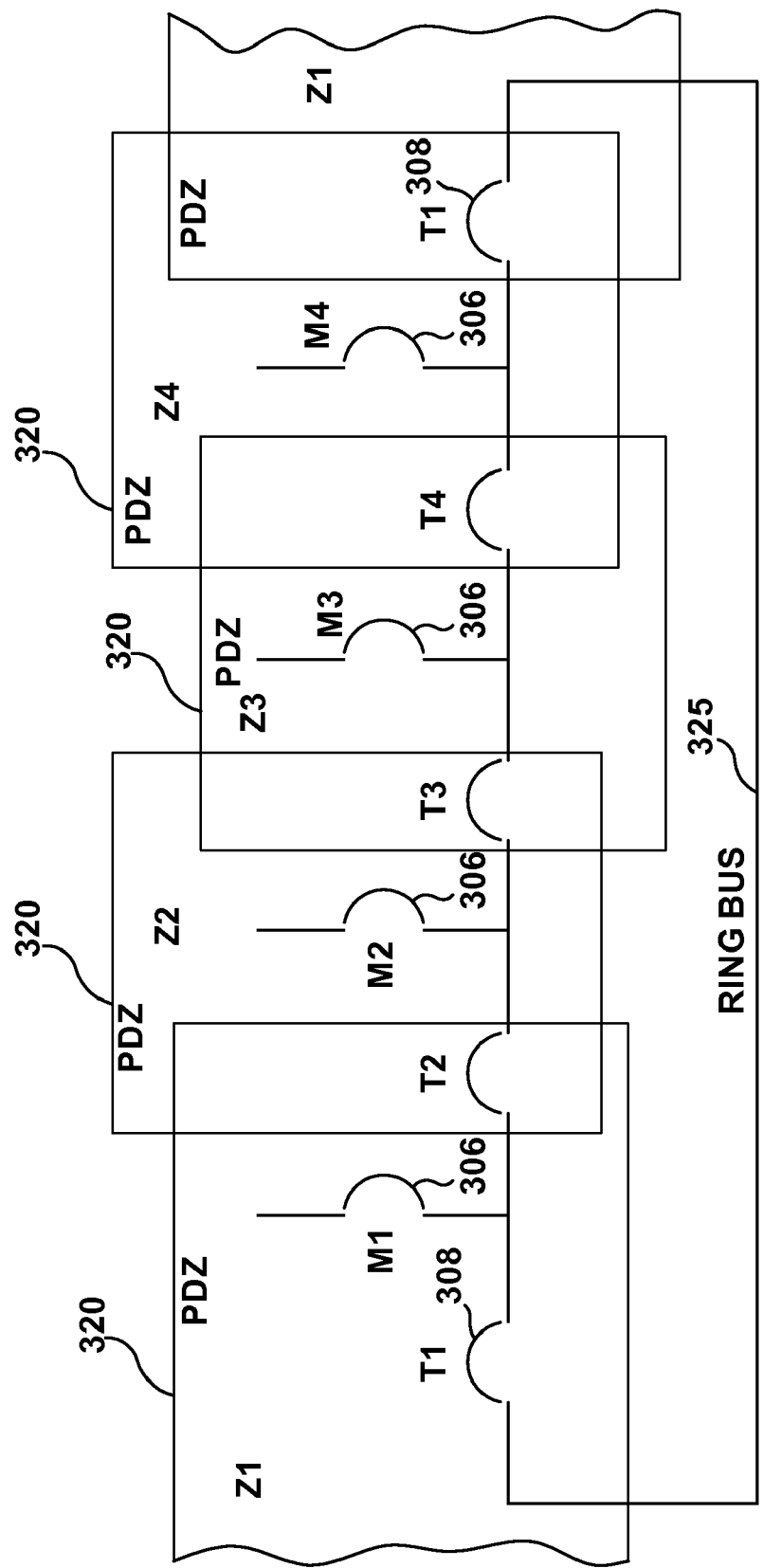
FIG. 27 illustrates an embodiment of a circuit used with the present invention having four overlapping partial differential zones.

It should be noted that in an alternate embodiment of the present invention, multiple zones may be overlapped. FIG. 27 illustrates an embodiment of the present invention with four overlapping partial differential zones 320. Each partial differential zone 320, is referenced as one of Z1, Z2, Z3 or Z4. Each partial differential zone in the present embodiment includes a main circuit breaker 306, labeled M1, M2, M3 or M4, for each zone Z1, Z2, Z3 or Z4, respectively. Each main circuit breaker is labeled with an M and is meant to distinguish each breaker as a source breaker. Additionally, each partial differential zone includes two bus tie breakers, with each bus tie breaker contributing to two zones, as can be determined in FIG. 27. For example, bus tie breaker T1 is part of Z1 and Z4; bus tie breaker T2 is part of Z1 and Z2; bus tie breaker T3 is part of Z2 and Z3; and bus tie breaker T4 is part of Z3 and Z4. The bus tie breakers 308 are on ring bus 325. The four zones Z1, Z2, Z3 and Z4 together comprise a global zone.

An example of tier matrix for tie breaker T1 in a power system as defined in FIG. 27 is presented below.

TABLE 1

Example of tier settings matrix for tie breaker T1 of FIG. 27

| Faulted Zone | Direct Fault Current Flow | | Indirect Fault Current Flow | |
|---|---|---|---|---|
| | Reference Breaker | Delta | Reference Breaker | Delta |
| 1 | N/A | N/A | N/A | N/A |
| 2 | T2 | 1 | T3 | 2 |
| 3 | T3 | 2 | T4 | 1 |
| 4 | N/A | N/A | N/A | N/A |

With respect to the overlapping zone configuration of FIG. 27, the example tie matrix above provides fault zone information with respect to T1. In the example of Table 1, settings for faults in zones 1 and 4 should not be set, since tie T1 is a member of these two zones. Settings for fault in zone 3 should not be set either, since in this case zone 1 that tie breaker T1 is member of is not adjacent to the faulted zone (all tie breakers in this zone are outer ties).

Each of outer tie breakers has a tier assignment matrix defined. The content of the table specifies the tier settings for exemplary possible system fault conditions for non-faulted zones that are adjacent to the faulted zone (zones that contain at least one outer tie). Specifying tier matrices for zones containing only outer ties is not needed since adjacent zones provide new tier values for those ties. The matrices defines reference breakers and deltas for conditions when tie breaker feeds current directly or indirectly into fault location. Each tie breaker has a maximum four different pairs of reference breakers and corresponding deltas. The number of reference breakers and corresponding deltas may be different for systems with smaller than 4 numbers of zones. Additional tier value are calculated based on the location of the fault (i.e. which zone the fault is within) and are equal to tier value of reference breaker for the faulted zone decremented by a delta value as can be determined by one of ordinary skill in the art.

Further with respect to the embodiment of FIG. 27, should multiple faults (multiple faults at different zones) be experienced at substantially the same time, the system will update faulted zones with new tier and ST time delay values as may be determined by one of ordinary skill in the art. Breakers in backup zones will have their tier and ST time delay adjusted accordingly for each of the faults as may be determined by one of ordinary skill in the art.

With respect to FIG. 27 and Faults in Adjacent Zones, if there are multiple zones that are in an in-zone fault state and these zones are adjacent (zones that have shared breakers), the system will assign tier and ST time delay values accordingly to the fault type for the member breakers of each zone. While setting new values to the shared breakers, the system will make sure that in case that one of the faulted zones is in an in-zone bus fault, settings made to shared breaker by this zone prevail. In case of any other fault type combination, the system will set tier and ST time delay values of shared breakers only in case that new value is greater than previously set.

Figure 18:
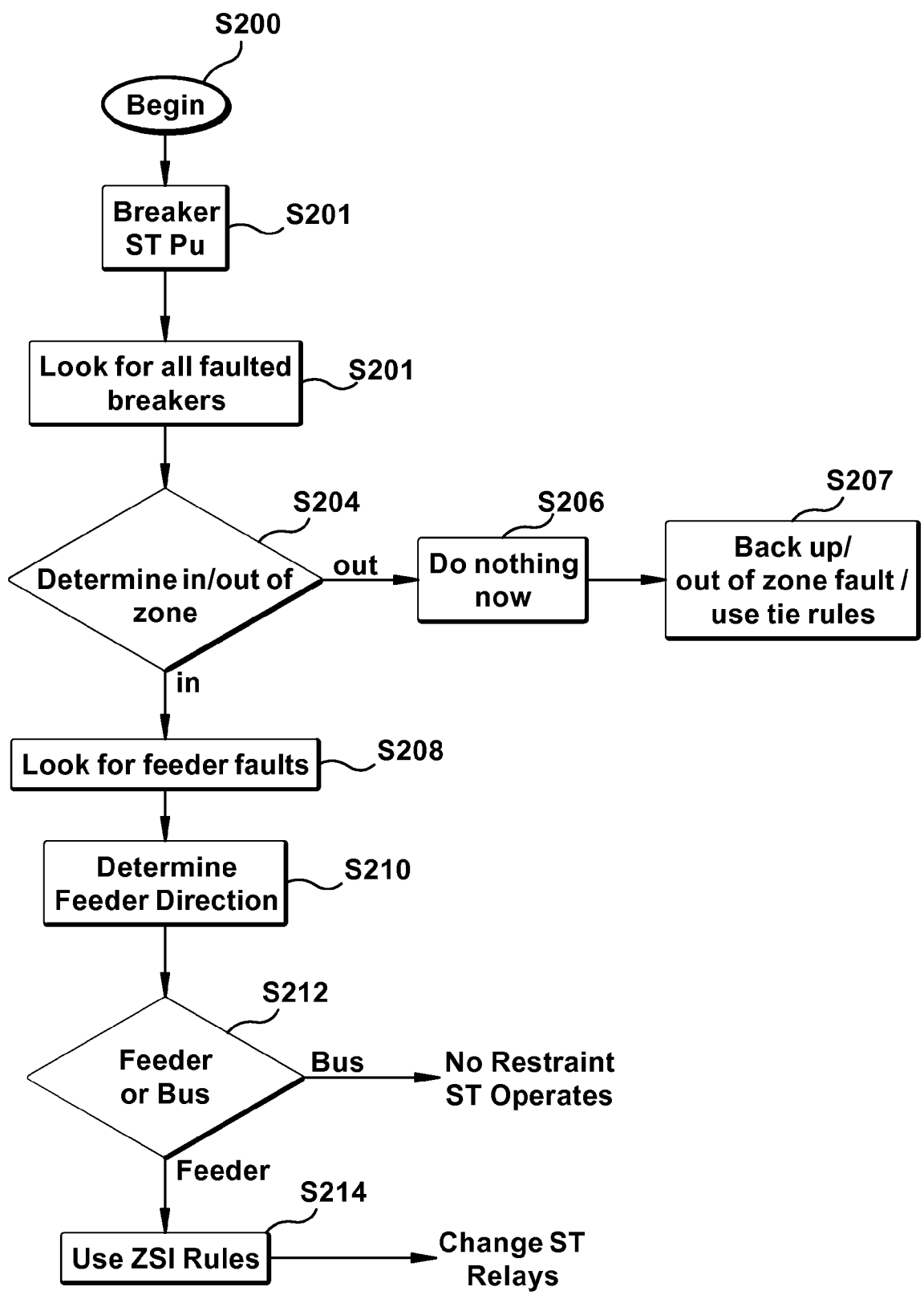
FIG. 18 is a flow chart of an embodiment of the present invention for determining fault location using current direction data.

FIG. 18 is a flow chart of an embodiment of the present invention for determining fault location using current direction data. At step S200 the method begins. Next at step S201 a breaker goes into short-time pickup. Next at step S202 all faulted breakers on the system are sought. Next at step S204 a terminination is made as to whether current in the partial differential zone is flowing IN or OUT of the PDZ. If the current is flowing OUT of the PDZ then at step S206 nothing is done. However, step 206 can alternately be followed by step S207 wherein for an out of zone fault, the tie breaker rules or calculations are followed. Returning to Step S204, if the current is determined to be flowing IN to the PDZ then at step S208 feeder faults on the system are sought. At step S210, a determination is made of feeder fault current directions for the PDZ. Next at query S212 a determination is made as to whether the fault current is for a feeder fault or a bus fault. If the answer to query S212 is bus fault, the no restraints are used and the short-time (ST) pick up operates. If the answer to the query of step S212 is that feeder fault current is present, then at step S214 the ZSI rules are performed. Following the ZSI rules, the ST delays are changed, as is described in the matrix, Table 1, provided supra.

Method for Detection of Fault Current Direction Ahead of Main Circuit Breakers: Absolute Direction Analysis based on relative direction of current in the source circuit breakers would yield inconclusive results. In the case of a fault on a main's line side the fault location, analysis based on relative direction of current in the source circuit breakers would be indeterminate; Neither the left nor the right bus would show the fault to be located therein. Both buses would show the tie and main with current flowing in opposite directions indicating a through-fault. See FIG. 15 titled Fault Contribution to Fault Ahead of Main for an illustration of the indeterminate situation. To determine a fault location in this situation, knowledge of actual current direction through the main circuit breaker(s) is required.

In a single-processor-based system, present situation data may be compared to past situation data stored in the single-processor-based system. The present and past situation data provides for comparison of pre-fault voltage to pre and post-fault current after current in excess of the pick-up threshold is detected. This embodiment of the present invention compares a phase angle of fault current with the phase angle of pre-fault voltage, and detects a reverse current fault. A pre-fault voltage phasor maybe continuously calculated, updated and stored (whereby the prior value is discarded when it is updated (or thereafter). When current magnitude exceeding fault magnitude is exceeded, the voltage phasor from a predetermined number of prior cycles is used as a reference (i.e. 20 cycles). Reversal is indicated by an 180° shift, as well as additional lag the fault conditions might introduce. Post fault phase voltage is an unreliable source of reversal information as voltage may collapse considerably during fault conditions. In a case of substantially complete voltage collapse, the small remaining voltage would be the bus voltage (IR) drop that is in phase with current and hence would not yield phase difference information needed to make a determination of reverse current fault. For the above-explained reasons, the calculation implemented using equation (3) below is used to detect current reversal.

$$150° \leq ang(I) - \alpha \leq 250° \quad (3)$$

With respect to equation (3), ang(I) is the angle of the positive-sequence current phasor and $\alpha$ is a pre-fault voltage positive-sequence phasor. The expected theoretical angle for a forward current is in the range of about 0° to 90° for a purely resistive to purely inductive current. A reversal in current adds 180° and ranges from about 180° to 270°. Practically, the forward angle may be in a range of about 0° to 60° for resistive to very inductive loads. A reversal of about 180° would cause the angle to shift to about 180° to 240°. The above method and equation identifies a fault shifting from load currents flowing at about 30° leading to about 70° lagging ($-30° \leq \alpha \leq 70°$). The pre-fault positive-frequency voltage phasor would be compensated for any mismatch between sampling rate and frequency. That compensation is ignored in the above formula for sake of simplicity; however compensation could be performed by one of ordinary skill in the art.

Equation (4) follows and may be performed on each phase current periodically to determine fault current.

$$(I_{RMS}^2) \geq (P_{RC})^2 \quad (4)$$

With respect to equation (4), the reverse current pick-up equation, $I_{RMS}$ could be computed form ½ cycle of current samples for each phase and $P_{RC}$ is the reverse current protection setting chosen for the main circuit breaker being considered. Once it is determined that a current through the main has exceeded the pick-up threshold for reverse current pick-up, a series of calculations can be run comparing the angular relationship between pre-fault positive-sequence current and post fault positive-sequence current by referencing both to pre-fault positive-sequence voltage. If the current is determined to have reversed then the fault is ahead of that device. Since this reverse current setting need not be considered for forward current coordination analysis the pick-up level may be quite low and the delay only as long as required to make a reliable trip decision. Zone-selective-interlocking can provide back up levels of protection even in this reverse direction by reversing the hierarchy implemented for forward faults.

It should be noted that in this embodiment of the present invention, 1) the range of expected fault currents, CTs will be heavily saturated, leading to large differential errors; and 2) separate differential zones for each substation transformer are used to make the system trip properly.

Figure 29:
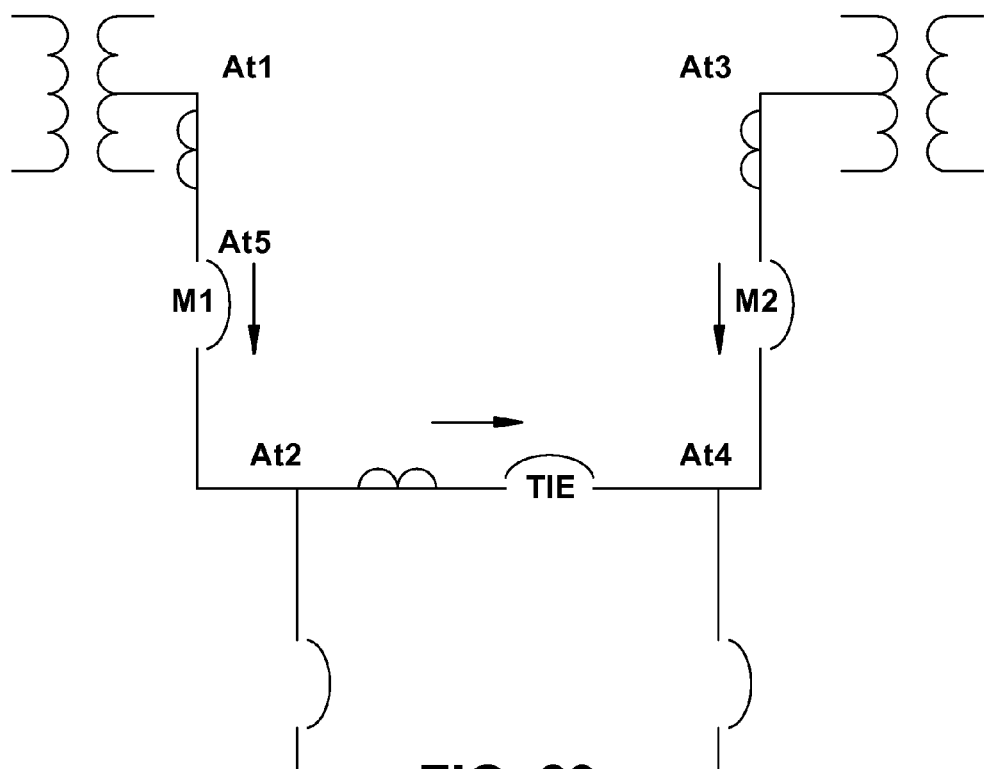
FIG. 29 illustrates a circuit diagram upon which bus and/or reverse fault currents in paralleled double-ended systems are located.

We have re-visited the issues and have synthesized a function that will locate bus and reverse faults in paralleled double-ended systems in the face of CT saturation without requiring measurements of the substation transformer currents. The situation is depicted in FIG. 29.

The embodiment of the system of the present invention is doubly fed by two substation transformers that are solidly grounded on the secondary side. All three breakers are closed. A problem situation is any type of solid fault at locations 1, 2, 3, 4, or 5 of FIG. 29. The problem is that, although it is easier to detect that there is a fault from the large amounts of current that flows through all three breakers for faults at those locations, location of the fault based on the relative magnitudes of the currents does not work. Another r approach is needed to determine whether the fault is internal or external and also determine on which side of the tie breaker (left or right) the fault is located.

A workable method for these determinations is based upon the following observations (again, referencing FIG. 29: 1) For internal faults at locations 2 and 4, the currents through the main breakers are in the same direction; 2) For external faults at locations 1 and 3, the currents through the main breakers are in opposite directions; 3) It is possible to distinguish between locations 2 and 4 by comparing the direction of the current through the tie breaker with the current through either of the main breakers; 4) Distinguishing between locations 1 and 3 cannot be done based solely on the relative directions of currents. (Paradoxically, it could be done in a triply fed system.) However, by also looking at the phase angles between voltages and currents, it is possible to distinguish between fault locations 1 and 3.

The method of an embodiment of the present invention incorporates the following steps:

1) Compute positive sequence currents from phasor values, every ½ cycle, over a one cycle window, for each main breaker and the tie breaker. Also compute positive sequence voltage for the bus and correct to a line to neutral phase angle reference if there is any rotation in the PT connection. Computations are performed every ½ cycle, whether or not there is a fault. By looking at actual test waveforms, it can be determined that phasors are accurate enough for the method, even in the face of severe CT saturation.

2) Include the method described herein the batch of protection calculations that run every ½ cycle, and integrate them. This method is triggered by one or more of the magnitudes of the fault currents at the main or tie breakers exceeding a predetermined threshold, without the presence of a fault apparent on one of the feeders. This is an indication there is a bus fault or a reverse fault that is being fed backwards (i.e. backfed) through the tie breaker.

3) Determine whether the fault is internal (locations 2 or 4) or external (locations 1 or 3), by comparing the phase angle of the positive sequence current through main breaker M1 with the positive sequence current through main breaker M2. The fault is internal if the two currents are in phase, otherwise it is external.
4) If the fault is internal, determine which side of the tie breaker it is located by comparing the phase angle of the positive sequence current through the tie breaker with the positive sequence current through one of the main breakers. In theory, the comparison can be made with either of the main breakers, though the one with the larger current magnitude is a better choice because it provides somewhat more accurate results.
5) If the fault is external, locate it by comparing the direction of the voltage drop due to the positive sequence current through the main circuit breaker with the pre-fault positive sequence voltage on the bus. The positive sequence voltage drop due to the current is computed by multiplying it by the nominal complex impedance of one of the substation transformers. The magnitude of the impedance used is not important to the this calculation; however, the impedance angle should be approximately correct.
6) Calculate the fault location every ½ cycle. Declare the fault location whenever it is found at a given location a total of two times. This will take about 1 cycle, but may take as long as 1.5 cycles.
7) When the fault location is determined, trip the appropriate breakers. For a fault at location 1, trip main M1 only. For a fault at location 2, trip the tie and main M1. For a fault at location 3, trip main 2 only. For a fault at location 4, trip the TIE and main M2.

Note that faults at certain points in the system=lead to conservative operation. To overcome conservative operation, two CTs for each breaker can be provided in an alternate embodiment; however, two CTs per breaker is costly. For example, consider a fault at location Rt5, the method will locate it as an internal fault to the left of the tie, with the result of tripping the TIE and one of the mains M1, M2 in a situation where simply tripping one of the mains M1, M2 (and not the TIE too) would have been enough.

The additional calculations for this method as follows. Besides the formulas for computing sequence components for voltage and current, two more equations are used to compute fault direction. First, there is a formula for deciding whether two currents are in the same or opposite direction. This can be done by taking the real part of the product of one of the currents times the complex conjugate of the current. If the real part is positive, the currents are approximately in the same direction. If the real part is negative, then the currents are approximately in the opposite direction. The formula is robust, and tolerates up to a ninety degree phase angle error between the two computed phasors.

For example, the relative direction test for the currents through the two main breakers is computed from their positive sequence phasor values in rectangular coordinates as follows in equation (9):

$$\text{Real}(\overline{I}_{main1} \cdot \overline{I}_{main2}^*) > 0?$$

$\overline{I}_{main1}$=positive sequence current phasor through main 1

$\overline{I}_{main\ 2}$=positive sequence current phasor through main 2

* denotes complex conjugate

There is a similar test to determine whether an equivalent voltage drop attributed to a sequence current is in phase with the pre-fault positive sequence voltage. An additional step is to multiply the positive sequence fault current times an approximation to the complex impedance of the substation transformers. It is not necessary to use the correct magnitude of the impedance. Only the phase angle should be approximately correct, so an impedance with a magnitude of one could be used as follows in equation (10):

$$\text{Real}(\overline{I}_{tie} \cdot \overline{Z} \cdot \overline{V}_{bus}^*) > 0?$$

$\overline{I}_{tie}$=positive sequence current phasor though the tie $\overline{Z}$=approximate complex impedance of the substation transformers $\overline{V}_{bus}$=pre-fault bus voltage

* denotes complex conjugate

The reason the pre-fault voltage is recommended rather than the actual bus voltage is that the pre-fault voltage gives a better direction indication, since it is in phase with the equivalent voltage on the primary sides of the substation transformers. Alternately, if primary voltages were available, we would use those values; however, they are not available. Hence, the pre-fault voltage provides enough accuracy for the calculation.

The use of sequence quantities rather than individual phase quantities simplifies the calculations and make the identification of fault type unnecessary. However, it is important to recognize and correct for phasor rotations that are introduced in the connections of the PTs. For example, if line-to-line voltage transformers are used, it may be necessary to rotate the computed bus voltage phasors by 60 degrees.

Figure 30:
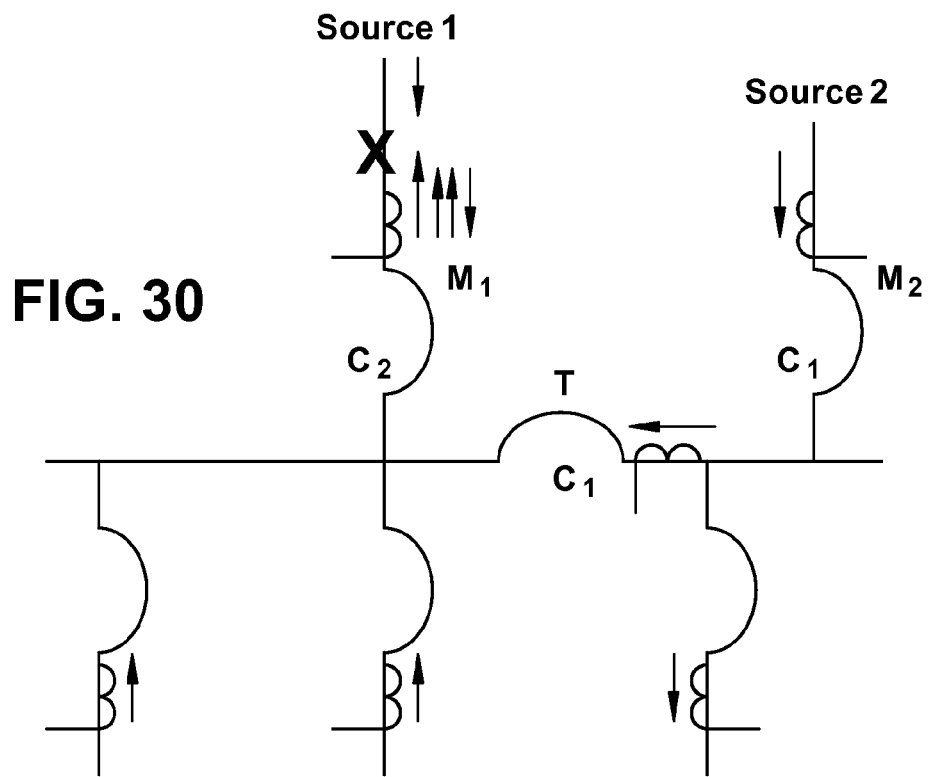
FIG. 30 is a circuit diagram showing current flow in an embodiment of the present invention.

FIG. 30 is a circuit diagram showing current flow in an embodiment of the present invention. Main CB will see fault current contribution from all other sources including motor loads now providing fault contribution. The motor contribution may, or may not be significant. Where C2=C1+motor contribution, the current is still flowing to loads.

Figure 31:
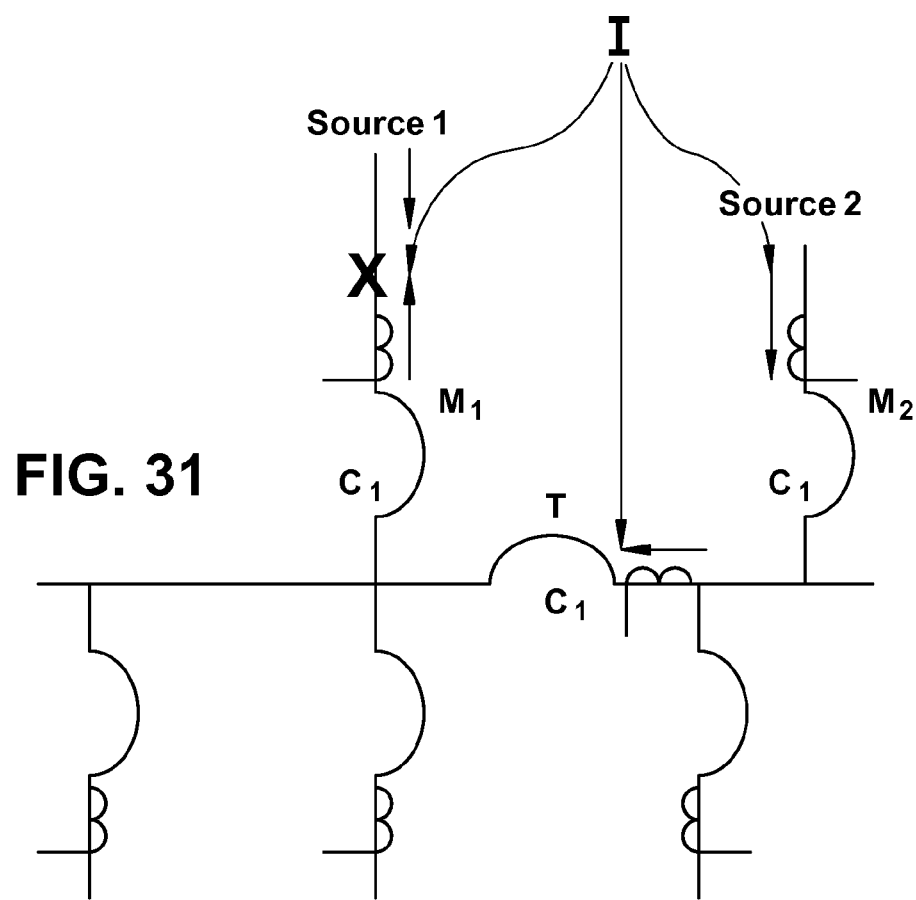
FIG. 31 is a circuit diagram showing current flow in an embodiment of the present invention.

FIG. 31 is a circuit diagram showing current flow in an embodiment of the present invention. Both mains and the tie will see the same current ($C_1$), from source 2. Main one may also see additional current from motor contribution. The motor contribution may and continuing load currents, or may not be significant. At I in FIG. 31, the current magnitude may be substantially equal; only direction through device is unique.

Figure 32:
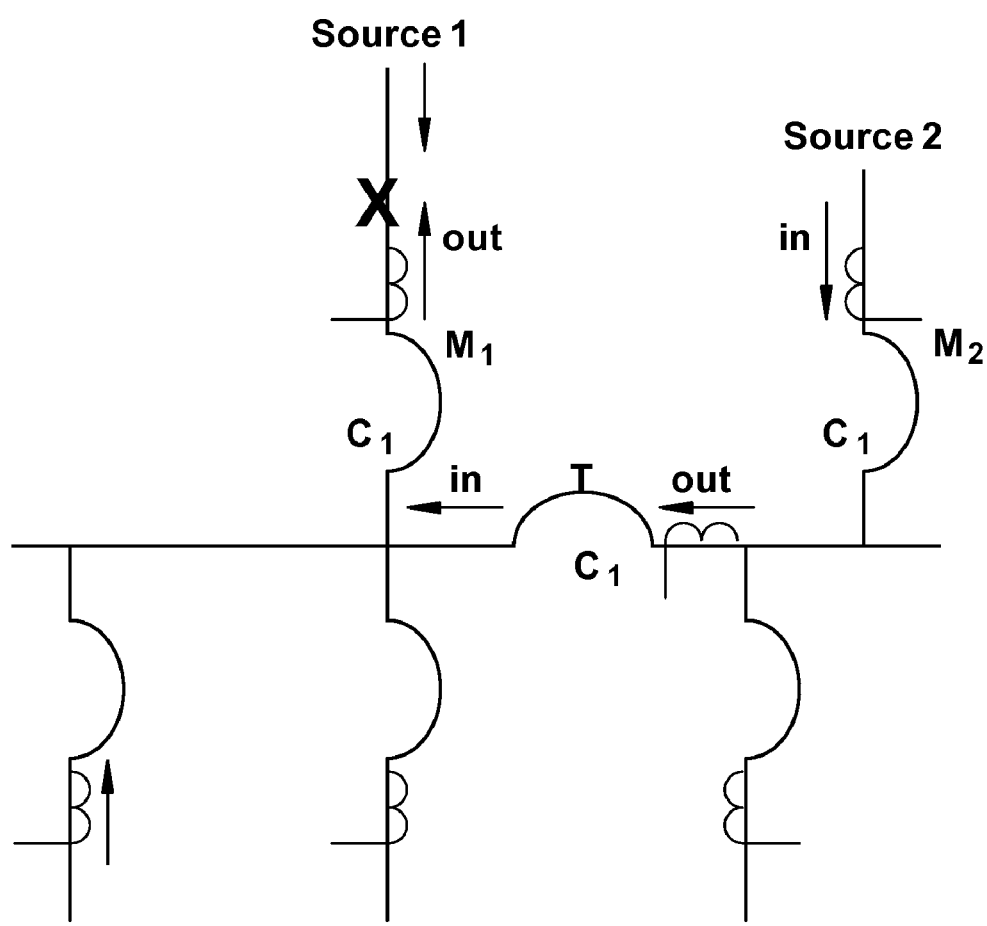
FIG. 32 is a circuit diagram showing current flow in an embodiment of the present invention.

FIG. 32 is a circuit diagram showing current flow in an embodiment of the present invention. Both main buses see a main and a tie current in opposite directions (1 in and 1 out). Hence relative direction comparisons would indicate a through fault and not an in fault condition. Feeder fault current contribution may or may not be present in sufficient magnitude to be sensed so it is not a reliable resource for relative current comparison.

Figure 33:
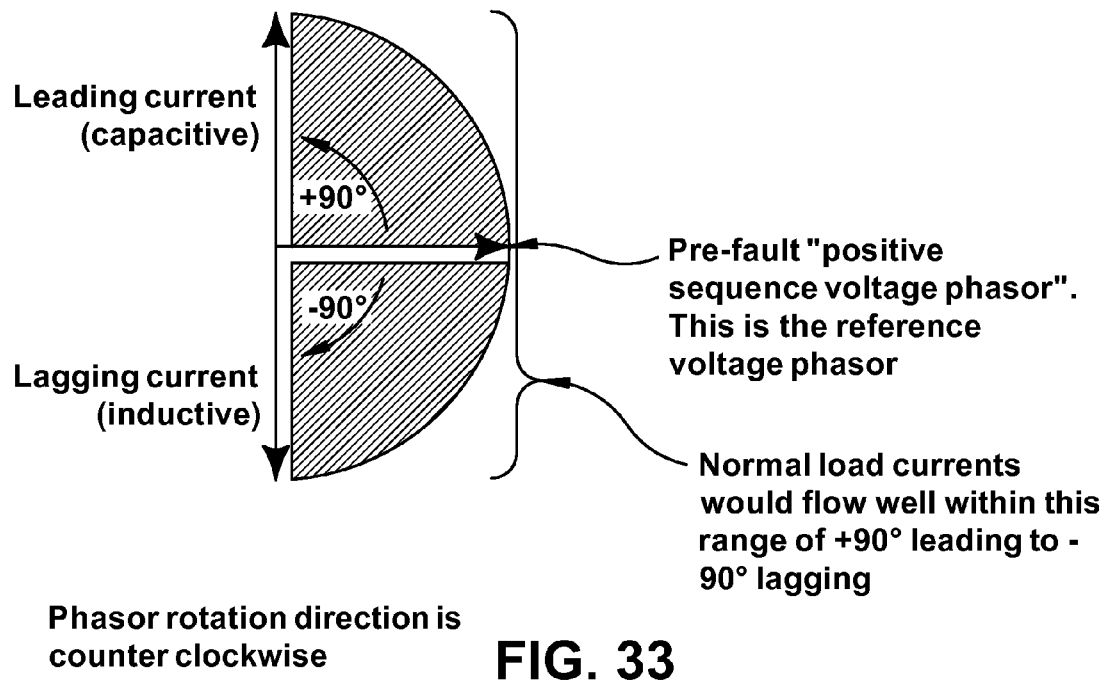
FIG. 33 is a graph illustrating pre-fault positive sequence phasors for an embodiment of the present invention.

FIG. 33 is a graph illustrating pre-fault positive sequence phasors for an embodiment of the present invention. Pre fault conditions could range form completely lagging inductive to completely leading. Current will never completely lag (−90 deg), or completely lead (+90 deg) voltage. Commercial and industrial power loads tend to range from slightly capacitive to moderately inductive. The angle in the forward current will range from about −90 to +90 degrees.

Figure 34:
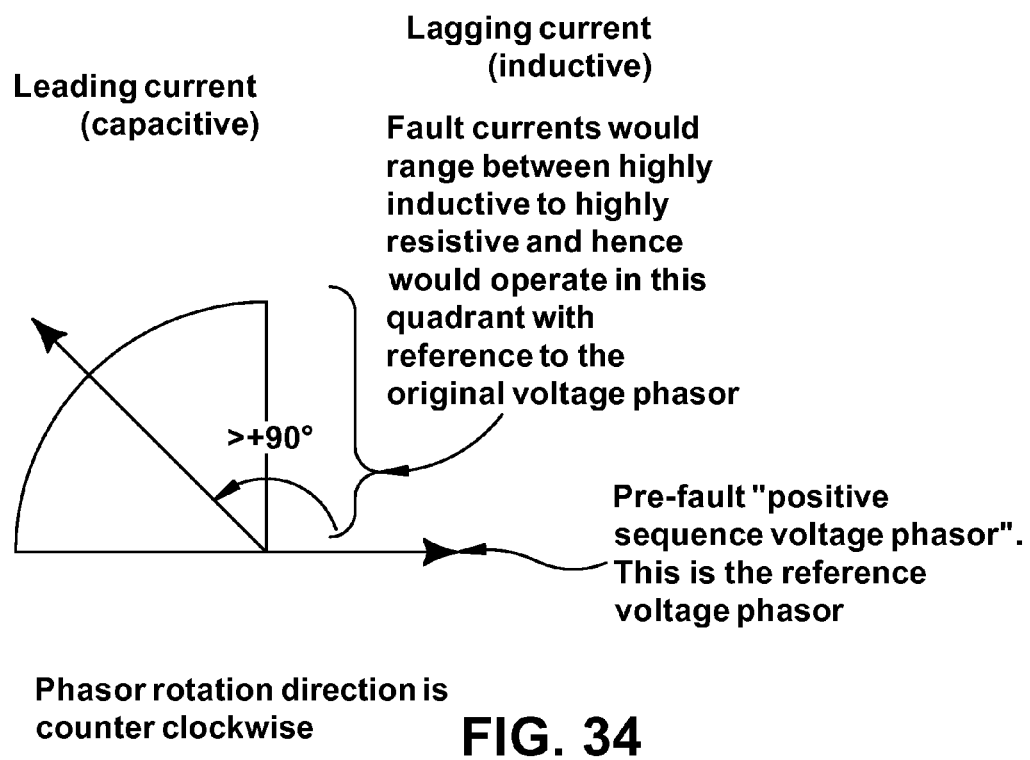
FIG. 34 is a graph illustrating Post-fault positive-sequence reverse-fault current phasor and pre-fault positive-sequence voltage reference phasor for an embodiment of the present invention.

FIG. 34 is a graph illustrating Post-fault positive-sequence reverse-fault current phasor and pre-fault positive-sequence voltage reference phasor for an embodiment of the present invention. Pre fault conditions could range form completely lagging inductive to completely leading. Current will never completely lag (−90 deg), or completely lead (+90 deg) voltage. Commercial and industrial power loads tend to range from slightly capacitive to moderately inductive. The angle in the forward current will range from about −90 to +90 degrees. Note that allowing for capacitive loads on the line side of the main and for relatively small fault magnitudes requires consideration of the bottom left quadrant. The exact function can include phasors in this area as well.

In an embodiment of the present invention, the system described in the patent reference disclosed supra., provides Reverse Fault function. This function is independent from the DZSI function. In an embodiment of the present invention, the Reverse Fault function is optioned per line-up basis; and there is one instance of this function per circuit breaker classified as a main breaker in the system. The intelligent electronic device (also referred to as a relay) executes a protection pass, i.e. every half cycle, every 8.333 ms for 60 Hz, and every 10.000 ms for 50 Hz system.

This protection function behaves in a similar way to the Short Time Over-current protection relay. Availability of the function is independent of a node's configuration. The Reverse Current Protection function of the IED or relay is capable of detecting a reverse current fault condition at various fault magnitudes.

Reverse Current Pick-Up

The term Pick-up indicates that the current on one or more phases has reached or exceeded a threshold, or predetermined amount, for a given function. Since there are multiple fault cases, for example, −3-phase, single-phase, phase-to-neutral, positive-sequence current and voltage for the angle comparison can be used as may be determined by one of ordinary skill in the art.

For calculation of compensated pre-fault voltage phasor refer to section regarding pre-fault phasors, infra. The historical voltage phasor is the voltage phasor calculated at for example, n−40 half-cycles. Where n is the current data half-cycle that is used for calculation of current phasor. This effectively means that the relay will not operate for first, for example, 40 half cycles since the start of the system. Once all pre-fault data is populated, the relay will log a corresponding event indicating that from now on it is ready to perform protection task. Throughout the operation the relay will continue collecting pre-fault data, discarding the information for the oldest time slot with each protection pass. If the magnitude of the pre-fault voltage phasor, for example, is below 75% of nominal voltage, the phasor is considered invalid for the comparison and the second pickup condition is assumed as false. At that point, the relay does not go into pickup.

The angle between pre-fault voltage and fault current phasor is substantially continuously checked as long as the current level is above the pickup setting. If reverse condition is detected in any two out of three consecutive half-cycles, relay shall declare fault as a reverse fault and shall go into pickup. Once the relay is in pickup, it will continue heating the accumulator until the current falls below the dropout level. Dropout will not be function of pre-fault voltage and actual current angle. Once relay declares fault as a reverse current fault, event if relay drops out from pickup it will consider fault as a reverse until accumulator cools completely. This means that if current level goes above the pickup setting one more time after it was already below dropout level but before accumulator had a chance to cool, relay will not perform angle check to verify if the fault is a reverse fault. Instead, it will assume that the fault is the same fault as detected before and will go into pickup.

If a given main breaker is not in pickup, and the Reverse Current accumulator is equal to zero, the system will not modify the accumulator for that breaker. If a given main breaker is in pickup, then the system will "heat" the accumulator for that breaker. If a given main breaker is not in pickup, and the accumulator is not equal to zero, then the C/CPU will "cool" the accumulator for that breaker.

Phasor Rotation Compensation

Reverse Current Protection relay will obtain frequency measurements from a known frequency method. For each voltage phasor taken, corresponding system frequency shall be obtained. Rotation adjustment can be performed by one of ordinary skill in the art. Compensation functions can be performed by one of ordinary skill in the art for values such as, for example phase angle offset.

Reverse Current Heating. The Reverse Current accumulator will increment or "heat" whenever the mean squared input current of at least one phase exceeds the Reverse Current pickup threshold regardless the result of current and voltage direction test.

The manner in which a Reverse Current accumulator will be updated depends upon the type of Reverse Current protection curve has been selected, and the value of $I^2_{RMS}$. The accumulator update can be determined by one of ordinary skill in the art.

Reverse Current Cooling

When the Reverse Current function drops out of pickup, the Reverse Current accumulator will be decremented in a process called "cooling" to shorten any subsequent time to trip. The cooling time constant is fixed at for example 80 milliseconds. Other cooling constants may be determined by one of ordinary skill in the art.

Reverse Current Operation

Reverse current relay consists of two main building blocks. First one is very similar in functionality to Short Time protection element. It heats and cools the accumulator when current goes above pickup and drops below dropout level respectively. The relay however, is not declare to be going into and out of pickup. This decision is made only when the second part of the relay detects that current and voltage flow in opposite directions.

Second part of the relay is responsible of detecting which direction (downstream or upstream) fault current flows. If the second part of the relay does not detect current flow to be in reverse in relation to the voltage flow direction, even if the accumulator's level is greater or equal than trip threshold, the relay will not trip the breaker. In case that accumulator is above pickup level and current and voltage positive sequences are apart by a predetermined amount, the relay goes into pickup state. Once that happens relay is ready to trip a breaker whenever accumulator level reaches trip level.

Reverse Current Pickup and Trip Time Accuracy

Reverse Current pickup and trip time accuracy similar to other single point over-current protection relays'.

Error Compensation Note

Most of the error budget is allocated to the sensors and the node electronics. There are two places where the C/CPU or system can affect accuracy, however. The first is the actual functions performed by the C/CPU or system. These equations or functions operate on fixed-point data and will not be a source of additional errors. The second way in which the C/CPU or system can affect metering accuracy is the timing on the broadcast synchronization messages to the nodes. If the broadcast messages are sent out at intervals that are significantly different than nominal (8.3333 milliseconds for 60 Hz, 10.0000 milliseconds for 50 Hz), the accuracy of the pickup calculation will be affected.

Detecting Incorrect Phase Rotation

Relay will determine if system configured phase rotation corresponds to the actual. Relay will use positive sequence of voltage to complete this task. If calculated positive sequence is below 25% of nominal voltage value, relay will stop operating and a corresponding event shall be logged. Relay will start operating again as soon as positive sequence is again above 25% limit.

These comparisons plus appropriate error compensation, cooling and heating calculations can be used to provide quick reverse fault protection on any circuit breaker. This method is useful at main circuit breakers to detect reverse-fed fault current in parallel multiple-source systems or when substantial motor contribution can provide the required current to identify a fault.

Figure 19:
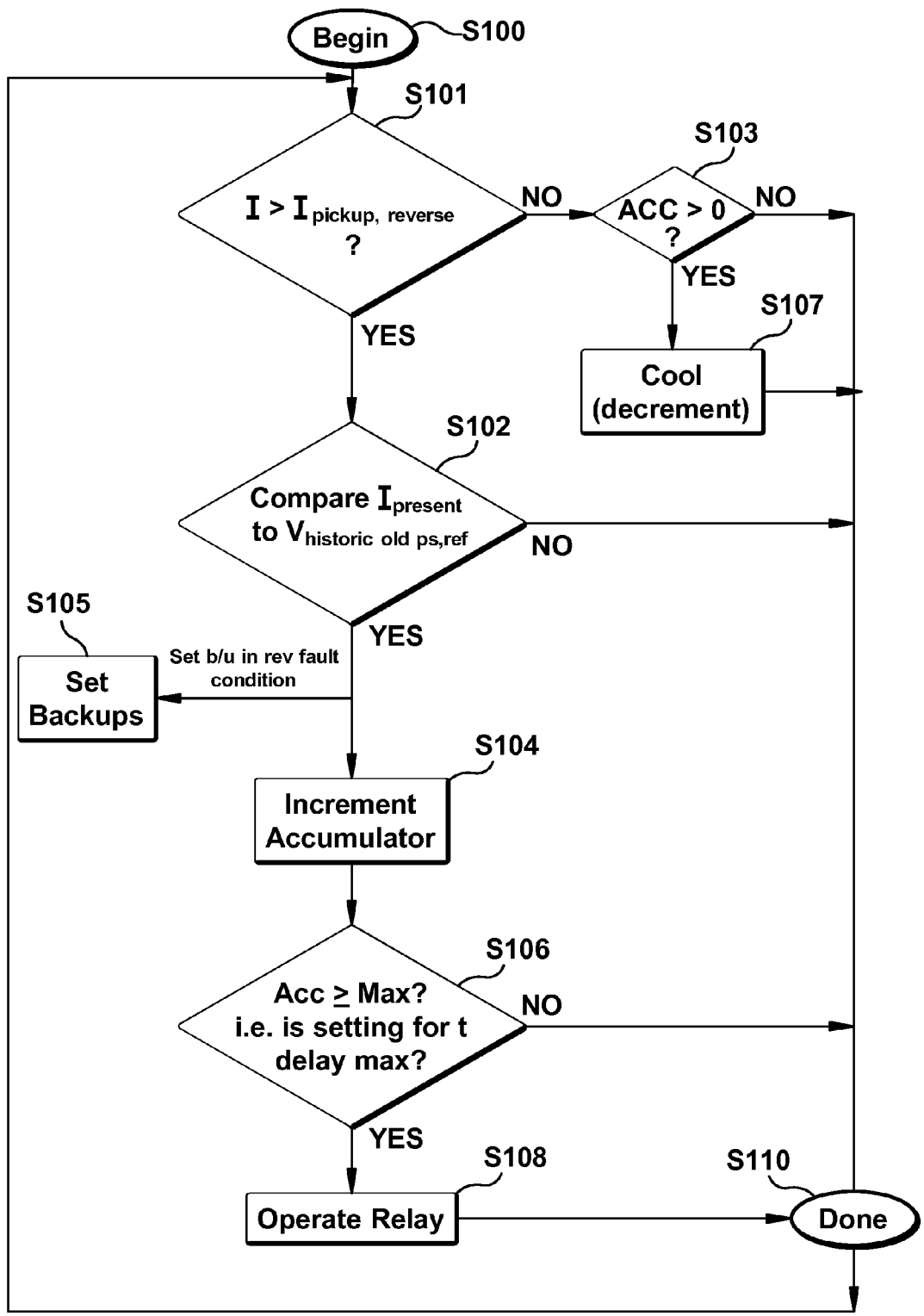
FIG. 19 is a flow chart of an embodiment of the present invention for determining fault location.

FIG. 19 is a flow chart of an embodiment of the present invention for determining fault location. At step S100 the method begins. Next at step S101 an evaluation is made as to whether I is greater than $I_{pickup}$. If the answer to the evaluation of S100 is no, then at step S103 a determination is made as to whether the accumulator is valued at greater than zero. If the answer to the query of step S103 is no, then the method proceeds to the end at terminator S110. If the answer to the query of step S103 is yes, then the system is decremented or cooled at S107 (cooling is a term used for decrementing in, for example, software and firmware programming). After the cooling step, S107, the method terminates at terminator S110.

Returning to Step S101 of FIG. 19, if the answer to the query of S101 where an evaluation was made as to whether I is greater than $I_{pickup}$ is yes then in step S102 $I_{present}$ is compared to $V_{historic}$. Once it is determined that a current through the main has exceeded the pick-up threshold for reverse current pick-up, a series of calculations is run comparing the angular relationship between pre-fault positive-sequence current and post fault positive-sequence current by referencing both to pre-fault positive-sequence voltage. Next, at step S105, backups are set when a reverse fault condition is determined. Alternately, at step S104, the accumulator is incremented (or heated). Heating is a term used for accumulating in, for example, software and firmware programming. Following step S104, at step S106 a determination is made as to whether the accumulator setting is greater than or equal to the maximum setting for time delay. If it is determined that the accumulator setting is not greater than or equal to the maximum setting for time delay, then the method proceeds to terminator S110. If at step S106 it is determined that the accumulator setting is greater than or equal to the maximum setting for time delay, then next at step S108, the relay operates. Following relay operation is terminator S110. Alternately, the method could continue beginning again at step S101 and following the steps as outlined above.

SUMMARY

Directionally Sensitive Zone-Based Protection

Based on this following set of solutions, available to the protection engineer, a zone-based protection system can be provided for multiple-source systems, or single source systems with large motor loads capable of substantial motor contribution or with multiple sources operating in parallel. The protection systems or subsystems operating substantially simultaneously are:

1) Bus-differential protection
2) Short-time—Reverse current detection at mains
3) Short-time—Directional zone interlocking between mains and ties
4) Short-time—Directional zone-selective-interlocking at feeders with zones above them
5) Instantaneous tripping function at feeders able to operate while other ZSI functions operate substantially simultaneously The instantaneous trip function is performed by any of several methods in which instantaneous tripping is obtained using digital trip apparatus and methods. If an instantaneous trip due to motor contribution to a bus fault or separate feeder fault is not desired then the instantaneous is set above the potential maximum motor contribution.

Short-time functions, including those for the circuit breaker operating substantially instantaneously can continue to function regardless of initiation of the instantaneous trip function as long as the system is designed and set to perform as stated. Such design can be performed by one of ordinary skill in the art.

The bus-differential function is performed independently of other functions and continues to function as long as a single current does not exceeded, for example, 10 times the rating of any CT within the zone. Bus-differential may be set significantly below the short-time pick-up level of any main or tie and offers the most sensitive fault protection by comparison to the other methods. Since bus-differential functions only for bus faults the setting is independent of other settings in the system that may be set for optimum selectivity or sustaining loads.

Reverse current protection at the main functions independently in the present embodiment and issues a trip signal to the proper circuit breaker when the reverse current equation or function is satisfied, including a medium voltage transformer main if provided. The same reverse current equation or function substantially simultaneously blocks action by the other short-time functions to prevent unnecessary nuisance tripping if other sources are able to continue to sustain load.

The functions of the present invention are able to reliably calculate fault information with as little as two half cycles of current data. The combination of the various functions operating substantially simultaneously can provide identification of fault location ahead, within and below a bus in a line up of switchgear with multiple sources and closed ties, regardless of motor contribution magnitude relative to the short-time settings of feeder circuit breakers. The minimum sensitivity of the bus-differential function allows faults below a bus' current rating to be located and the various short-time functions allow faults up to the short circuit rating of the equipment, if the circuit breakers allow it to be detected and located with 1 cycle of data.

Limitations in range of settings, circuits, and exact detection and clearing times depend on the specific implementation of the equations, functions and settings of embodiments of the present invention and described herein and the devices used to implement the embodiments of the present invention.

Figure 16:
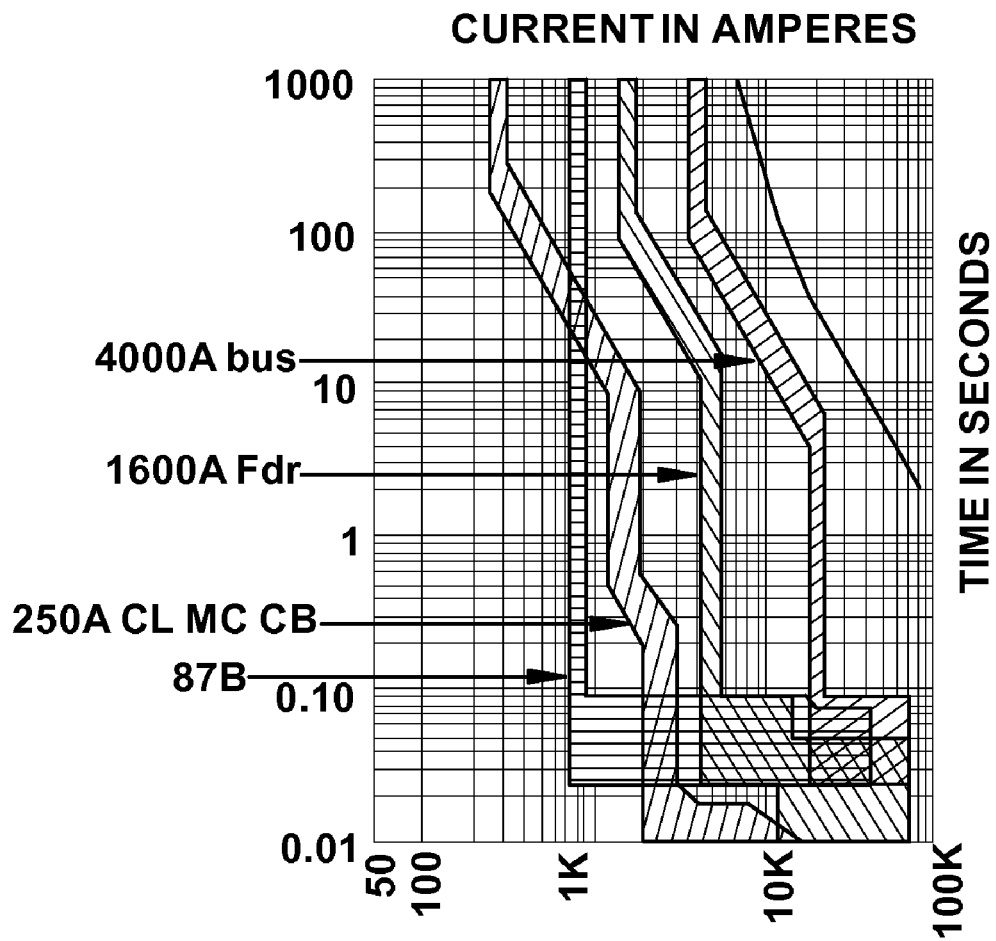
FIG. 16. illustrates TCC: MCCB, Swgr Feeder and Swgr Bus where a current limiting molded case circuit breaker located below the 1600 A feeder is added for comparison.

For example, the net effect of these implementation on 2500 kVA substation with a 4000 A main and tie, a 1600 A feeder and vacuum circuit breaker (CB) ahead of the transformer is shown on the time-current-curve in FIG. 16 titled TCC: MCCB, Swgr Feeder and Swgr Bus. A current limiting molded case circuit breaker located below the 1600 A feeder is added for comparison.

The Time-Current-Curve (TCC) shows the following devices:

1) 250 A molded case current limiting MCCB applied on a bus with 30 kA bolted fault available, 17,100 A arcing fault available at 100%, 14,500 arcing-current at 85%

2) 1600 A LVPCB feeder applied on a system with 65 kA total bolted fault current, calculated arcing at feeder load side of 30,500 A at 100%, 26,00 A at 85%, single source 3) 4000 A with 62 kA bolted fault current available from one source. 4000 A bus is protected with a combination of bus-differential protection set to pick-up at 800 A and functional up to 40,000 A, with a delay clearing in 92 ms. A zone selective function keeps the main operating at minimum time delay all the way to maximum fault value.

In addition the main CB is able to isolate the load side from any line side fault condition or if a parallel source is provided such as during a close transition transfer. This function would look like definite time function similar to how 87B is shown in FIG. 16. The reverse protection is not shown on this TCC. The feeder protection and main bus protection are fully selective. The MCCB may be fully selective based on its current limiting capabilities.

The calculated arc-flash currents downstream of the feeder are interrupted by a device operating substantially instantaneously, the main bus arcing-current is interrupted by devices operating at minimum time band yielding, for example, the following energy levels at 480V:

1) Main bus, 62 kA Ibf, 32 mm, 24", 0.092s==>7.9 cal, HRC2
2) Main bus, 62 kA Tbf, 32 mm, 18", 0.092s==>12 cal, HRC3
3) Feeder terminals, 32 mm, 18", 0.05s==>6.5 cal, HRC2
4) MCCB bus, 30 kA Ibf, 25 mm, 18", 0.05s==>3.8 cal, HRC1
5) MCCB terminals, 25 mm, 18", 0.017s==>1.3 cal, HRC0

The above listed arc-flash energy values do not reflect the result of actual testing of these devices for arc-flash performance, which would generally result in lower incident energy values nor do they account for motor contribution decrement which could lower values further. The above listed arc-flash energy values are calculated; calculations of arc-flash energy can be performed by one of ordinary skill in the art.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a relay device, in an electrical circuit comprising first and second main circuit breakers, and a bus tie circuit breaker connecting the first and second main circuit breakers, the method comprising:
   a) computing a first positive sequence current phasor for the first main circuit breaker and a second positive sequence current phasor for the second main circuit breaker;
   b) computing a first positive sequence voltage phasor for the first main circuit breaker and a second positive sequence voltage phasor for the second main circuit breaker;
   c) computing a correction of the first positive sequence voltage and second positive sequence voltage to a line-to-neutral phase angle reference if there is any rotation in a potential transformer connection;
   d) determining a fault has occurred when a magnitude of a current through at least one of the first main circuit breaker or the second main circuit breaker exceeds a predetermined threshold;
   e) determining a phase angle difference by comparing the phase angle of the positive sequence current phasor with the phase angle of the positive sequence voltage phasor for both the first main circuit breaker or the second main circuit breaker having the magnitude of current determined to have exceeded the predetermined level; and
   f) determining the fault is located upstream or downstream of the first main circuit breaker or the second main circuit breaker having the magnitude of current determined to have exceeded the predetermined level, if the phase angle difference is determined to be above a predetermined amount.

2. The method of claim 1 wherein the positive sequence voltage drop of each main circuit breaker having the magnitude of current determined to have exceeded the predetermined level is computed by multiplying the current through each main circuit breaker having the magnitude of current determined to have exceeded the predetermined level by a nominal complex impedance of one of a first and a second transformer upstream of the first and second main circuit breakers.

3. The method of claim 1 wherein the fault location is determined every ½ cycle.

4. The method of claim 3 wherein a fault location is declared when a fault location is determined to a given location a total of at least two times.

5. The method of claim 3 wherein the determined fault location is used to determine an appropriate circuit breaker to trip.

6. The method of claim 4 wherein for a fault a location 1, only the first main circuit breaker is tripped.

7. The method of claim 4 wherein for a fault a location 2, the first main circuit breaker and the bus tie circuit breaker are tripped within 1 second of each other.

8. The method of claim 4 wherein for a fault a location 3, only the second main circuit breaker is tripped.

9. The method of claim 4 wherein for a fault a location 4, the second main circuit breaker and the bus tie circuit breaker are tripped.

10. A computer program product comprising: a program storage device readable by a relay device in an electrical circuit comprising first and second main circuit breakers, and a bus tie circuit breaker connecting the first and second main circuit breakers, tangibly embodying a program of instructions executable by the relay device to perform method steps for operating the relay device, the method comprising:
    a) computing a first positive sequence current phasor for the first main circuit breaker and a second positive sequence current phasor for the second main circuit breaker;
    b) computing a first positive sequence voltage phasor for the first main circuit breaker and a second positive sequence voltage phasor for the second main circuit breaker;
    c) computing a correction of the first positive sequence voltage and second positive sequence voltage to a line-to-neutral phase angle reference if there is any rotation in a potential transformer connection;
    d) determining a fault has occurred when a magnitude of a current through at least one of the first main circuit breaker or the second main circuit breaker exceeds a predetermined threshold;

e) determining a phase angle difference by comparing the phase angle of the positive sequence current phasor with the phase angle of the positive sequence voltage phasor for both the first main circuit breaker and the second main circuit breaker having the magnitude of current determined to have exceeded the predetermined level; and l) determining the fault is located upstream or downstream of the first main circuit breaker and the second main circuit breaker having the magnitude of current determined to have exceeded the predetermined level, if the phase angle difference is determined to be above a predetermined amount.

11. The method of claim 2 wherein the positive sequence voltage phasor is computed using a pre-fault bus voltage.

12. The method of claim 1 wherein the phase angle of the positive sequence voltage phasor for the first main circuit breaker and the positive sequence voltage phasor for the second main circuit breaker is a pre-fault voltage phasor.

* * * * *

UNITED STATES PATENT AND TRADEMARK OFFICE
CERTIFICATE OF CORRECTION

PATENT NO. : 7,599,161 B2  
APPLICATION NO. : 11/618192  
DATED : October 6, 2009  
INVENTOR(S) : Premerlani et al.

It is certified that error appears in the above-identified patent and that said Letters Patent is hereby corrected as shown below:

In Column 2, Line 1, delete "predeterminted" and insert -- predetermined --, therefor.

In Column 3, Line 1, delete "1." and insert -- 1 --, therefor.

In Column 3, Line 3, delete "2." and insert -- 2 --, therefor.

In Column 3, Line 6, delete "3." and insert -- 3 --, therefor.

In Column 3, Line 8, delete "Tbf," and insert -- Ibf, --, therefor.

In Column 3, Line 9, delete "4." and insert -- 4 --, therefor.

In Column 3, Line 11, delete "5." and insert -- 5 --, therefor.

In Column 3, Line 12, delete "Scheme" and insert -- Scheme. --, therefor.

In Column 3, Line 13, delete "6." and insert -- 6 --, therefor

In Column 3, Line 23, delete "second." and insert -- second, --, therefor.

In Column 3, Line 27, delete "Tie" and insert -- Tie. --, therefor.

In Column 3, Line 33, delete "Instantaneous" and insert -- Instantaneous. --, therefor.

In Column 3, Line 40, delete "illustrates." and insert -- illustrates --, therefor.

In Column 3, Line 48, delete "16." and insert -- 16 --, therefor.

In Column 3, Line 51, delete "illustrates." and insert -- illustrates --, therefor.

In Column 5, Line 31, delete "methods." and insert -- methods --, therefor.

In Column 7, Line 61, delete "5." and insert -- 5 --, therefor.

In Column 15, Line 30, delete "respectively" and insert -- respectively. --, therefor.

In Column 15, Line 38, delete "I$\alpha$" and insert -- I$_\alpha$ --, therefor.

UNITED STATES PATENT AND TRADEMARK OFFICE
CERTIFICATE OF CORRECTION

PATENT NO. : 7,599,161 B2
APPLICATION NO. : 11/618192
DATED : October 6, 2009
INVENTOR(S) : Premerlani et al.

It is certified that error appears in the above-identified patent and that said Letters Patent is hereby corrected as shown below:

In Column 18, Line 51, delete "terminination" and insert -- termination --, therefor.

In Column 27, Line 26, delete "Tbf," and insert -- Ibf, --, therefor.

In Column 28, Line 8, in Claim 1, delete "socond" and insert -- second --, therefor.

In Column 29, Line 8, in Claim 10, delete "l)" and insert -- f) --, therefor.

Signed and Sealed this

Third Day of November, 2009

David J. Kappos
*Director of the United States Patent and Trademark Office*